US012180929B2

(12) United States Patent
Nakka et al.

(10) Patent No.: US 12,180,929 B2
(45) Date of Patent: Dec. 31, 2024

(54) SYSTEM AND METHOD FOR ACTIVELY MONITORING AN AIR GAP IN A WIND TURBINE BRAKE ASSEMBLY

(71) Applicant: General Electric Renovables Espana, S.L., Barcelona (ES)

(72) Inventors: Anand Nakka, Bangalore (IN); Siva Ram Surya Sanyasi Adavikolanu, Bangalore (IN); Aaron P. Janicz, Greenville, SC (US); Joseph Edward Birkenstock, Fountain Inn, SC (US); Arati Ajay Bhattu, Bangalore (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/573,978

(22) Filed: Jan. 12, 2022

(65) Prior Publication Data
US 2023/0220834 A1 Jul. 13, 2023

(51) Int. Cl.
*F03D 17/00* (2016.01)
*F03D 1/00* (2006.01)
*F03D 7/02* (2006.01)
*F03D 15/00* (2016.01)

(52) U.S. Cl.
CPC .......... *F03D 17/00* (2016.05); *F03D 7/0204* (2013.01); *F03D 7/0244* (2013.01);
(Continued)

(58) Field of Classification Search
CPC ...... F03D 1/181; F03D 7/0204; F03D 7/0212; F03D 17/00; F03D 17/012; F03D 17/022;
(Continued)

(56) References Cited

U.S. PATENT DOCUMENTS 6,302,241 B1 10/2001 Gronowicz, Jr.
8,317,462 B2 11/2012 Daniels et al.
(Continued)

FOREIGN PATENT DOCUMENTS

CN 103470663 B 10/2012
DE 202012012618 U1 * 7/2013
(Continued)

OTHER PUBLICATIONS

English machine translation of WO-2018/091497-A1, Oct. 31, 2023.*
(Continued)

*Primary Examiner* — Christopher Verdier
(74) *Attorney, Agent, or Firm* — Dority & Manning, P.A.

(57) ABSTRACT

A system and method are configured to monitor changes associated with an air gap in a brake assembly of a wind turbine yaw drive by: (1) receiving one or more sensor signals from one or more sensors that are indicative of changes associated with the air gap; and (2) comparing the changes associated with the air gap to certain thresholds to determine if the air gap is in need of attention. The system includes at least one proximity sensor arranged adjacent to the air gap, to monitor the air gap, and a controller. The controller is configured to receive the sensor signal(s) indicative of the changes associated with the air gap. The controller also is configured to compare the changes associated with the air gap to one or more air gap thresholds, and to implement a control action based on this comparison.

17 Claims, 15 Drawing Sheets

(52) U.S. Cl.
CPC ........... *F03D 7/0248* (2013.01); *F03D 15/00* (2016.05); *F03D 17/012* (2023.08); *F03D 17/018* (2023.08); *F03D 17/022* (2023.08); *F03D 17/029* (2023.08); *F03D 1/181* (2023.08); *F05B 2260/4031* (2013.01); *F05B 2260/80* (2013.01); *F05B 2260/83* (2013.01); *F05B 2260/902* (2013.01); *F05B 2260/903* (2013.01); *F05B 2270/1095* (2013.01); *F05B 2270/303* (2013.01); *F05B 2270/305* (2013.01); *F05B 2270/602* (2013.01); *F05B 2270/821* (2013.01)

(58) Field of Classification Search
CPC .... F03D 17/029; F03D 7/0244; F03D 7/0248; F03D 17/018; F05B 2260/80; F05B 2260/83; F05B 2260/902; F05B 2270/303; F05B 2260/903; F05B 2270/3032
See application file for complete search history.

(56) References Cited

U.S. PATENT DOCUMENTS

| | | |
|---|---|---|
| 9,441,692 B2 | 9/2016 | Schaefer |
| 10,337,576 B2 | 7/2019 | Lin et al. |
| 2015/0056072 A1* | 2/2015 | Perley ................... F03D 7/0288 416/61 |
| 2018/0291871 A1 | 4/2018 | Wibben et al. |
| 2022/0074387 A1* | 3/2022 | Asakawa ................ F03D 7/022 |

FOREIGN PATENT DOCUMENTS

| | | | |
|---|---|---|---|
| DE | 102009011986 B4 | | 11/2013 |
| EP | 2518363 A2 | | 10/2012 |
| EP | 2904699 A1 | | 8/2015 |
| EP | 3306077 A1 | | 11/2018 |
| EP | 3553309 A1 | | 10/2019 |
| KR | 10-2016-0056184 A | * | 5/2015 |
| WO | WO-2018/091497 A1 | * | 5/2018 |

OTHER PUBLICATIONS

English machine translation of DE-202012012618-U1, Oct. 31, 2023.*

English machine translation of KR-10-2016-0056184-A, Apr. 13, 2024.*

The EP Search Report for EP application No. 23150968.8, Jun. 7, 2023, 7 pages.

* cited by examiner

SYSTEM AND METHOD FOR ACTIVELY MONITORING AN AIR GAP IN A WIND TURBINE BRAKE ASSEMBLY

FIELD

The present disclosure relates generally to brake assemblies for a wind turbine, such as a yaw brake assembly of a wind turbine, and, more particularly, to a system and method for actively monitoring an air gap in a brake assembly of a wind turbine.

BACKGROUND

Wind power is considered one of the cleanest, most environmentally friendly energy sources presently available, and wind turbines have gained increased attention in this regard. A modern wind turbine typically includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

In order to efficiently produce electrical energy, it is typically desirable for the nacelle of the wind turbine to be oriented in aerodynamic alignment with the winds acting on the wind turbine. To properly orient the rotor blades relative to the direction of the wind, wind turbines typically include one or more yaw drive mechanisms configured to engage a yaw bearing for rotating the nacelle relative to the tower. However, once aerodynamic alignment is achieved, additional rotation of the nacelle relative to the tower must be resisted. As such, to resist such additional rotation, a wind turbine may include one or more yaw brake assemblies The yaw brake assemblies of modern wind turbines are typically cylindrical in nature and are inserted through the bedplate support frame. The yaw braking systems typically utilize the top surface of the yaw bearing as the friction surface and the bedplate support frame as the mounting structure for the braking load actuating unit, for example. The yaw brake assemblies also typically have brake pads configured to frictionally engage the yaw bearing. Due to the frictional sliding between the brake pads and the friction surface of the yaw bearing, the brake pads wear unavoidably over time. Thus, it is necessary to routinely inspect the yaw brake assemblies of the wind turbine to determine whether any or all of the brake pads need to be replaced, adjusted, or repaired. Moreover, wear and/or catastrophic failure can manifest quickly, from fast developing high-magnitude events, for example.

Thus, it is helpful to actively adjust operation of a wind turbine, based on the instant brake assembly conditions, for example, to avoid extreme, unnecessary, and/or unexpected wear of the brake assembly, or to avoid catastrophic failure of the brake assembly that can affect other portions of the wind turbine before routine maintenance and repair can take place.

Current brake assembly inspection methods require that a maintenance worker climb the wind turbine and either perform manual measurements of the brake assembly components and specifications, or dissemble the brake assemblies to allow for visual inspection of the brake assembly components, margins, and tolerances. Unfortunately, this inspection method is very expensive and time consuming. Additionally, since the inspection method requires that the wind turbine be shutdown, such inspections are typically performed only at normal maintenance intervals. Thus, wear issues occurring between the maintenance intervals go unnoticed, which can lead to significant damage to the wind turbine.

Accordingly, a system and method for actively monitoring the air gap in a brake assembly would be welcomed in the technology.

BRIEF DESCRIPTION

Aspects and advantages of the invention will be set forth in part in the following description, or may be obvious from the description, or may be learned through practice of the invention.

In one aspect, the present specification discloses a method for monitoring components of a brake assembly of a yaw drive assembly of a wind turbine. The method includes arranging at least one sensor adjacent to an air gap that is defined, at least in part, by a movable component of the brake assembly. The method also includes monitoring, via the at least one sensor, one or more changes associated with the air gap. The method also includes comparing the one or more changes associated with the air gap to one or more thresholds. The method also includes implementing a control action based on the comparison of the one or more changes associated with the air gap to the one or more thresholds so as to prevent or minimize damage to the brake assembly of the yaw drive assembly.

In another aspect, the present disclosure is directed to a yaw drive assembly for a wind turbine. The yaw drive assembly includes a yaw drive mechanism comprising a yaw drive pinion, a yaw drive gearbox, and a yaw drive motor, and a brake assembly arranged with the yaw drive mechanism. The brake assembly includes one or more brake plates, a movable component, and an air gap bound, at least in part, by the movable component. The one or more brake plates are configured to engage a friction surface of the yaw drive mechanism and the movable component is configured to move relative to the friction surface as the one or more brake plates wear. The yaw drive assembly also includes at least one sensor arranged adjacent to the air gap and a controller communicatively coupled to the at least one sensor. The controller configured to perform a plurality of operations including: receiving one or more sensor signals from the at least one sensor indicative of one or more changes associated with the air gap; comparing the one or more changes associated with the air gap to one or more thresholds; and implementing a control action based on the comparison of the one or more changes associated with the air gap to the one or more thresholds so as to prevent or minimize damage to the yaw drive assembly.

In another aspect, the present disclosure is directed to a system for monitoring components of a brake assembly of a yaw drive assembly of a wind turbine. The system includes at least one sensor arranged adjacent to an air gap positioned between one or more brake plates and a housing of the brake assembly. The one or more brake plates part of a movable component configured to move relative to a friction surface as the brake plate wears. The system also includes a controller communicatively coupled to the at least one sensor. The controller is configured to perform a plurality operations including: receiving one or more sensor signals from the at least one sensor indicative of one or more changes associated with the air gap; comparing the one or more changes associated with the air gap to one or more thresholds; and implementing a control action based on the comparison of the one or more changes associated with the air gap to the one or more thresholds so as to prevent or minimize damage to the brake assembly of the yaw drive assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
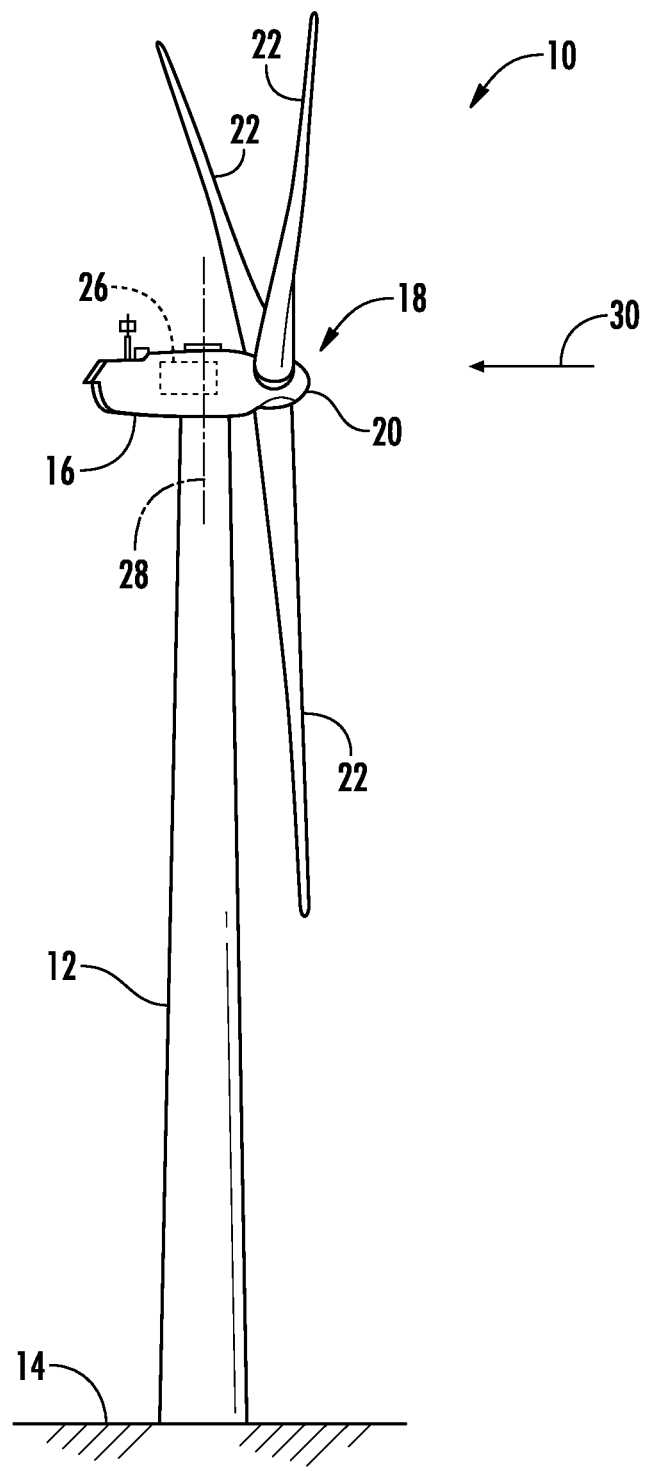
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a system and method for actively monitoring the air gap in a yaw brake assembly of a wind turbine. In an embodiment, for example, the system includes a controller and at least one sensor configured to sense relative position changes and/or relative displacement between components of the brake assembly, the sensor(s), and/or a friction surface of the wind turbine. In this way, the sensor(s) is configured to monitor one or more changes associated with the air gap as the brake plate(s) or other components of the brake assembly or wind turbine wear or shift, for example. Sensor signals associated with the change(s) are then transmitted to the controller. The controller then analyzes the input signals and generates output signals in response to circumstances where the change(s) associated with the air gap indicate that the brake assembly is in need of service, repair, adjustment, and/or replacement.

In another embodiment, the system is configured to remedy deficiencies in the prior art wherein electromagnetic holding brakes (e.g., spring-applied holding brakes) fail to disengage when instructed. "Electromagnetic holding brakes" as used herein include, but are not limited to, brakes configured to stop and secure a rotating shaft, for example, as well as brakes configured to secure in place selectively movable/rotatable components, such as a shaft. When no power is available to these exemplary types of brakes, the brakes are capable of being mechanically engaged and capable of securing a mechanism in place. Thus, such brakes are engaged via application of a persistent mechanical force, until an electromagnetic force is applied, thereby causing the brakes to disengage. Often, a reason for using such brakes is for improved safety and accuracy.

As it relates to wind turbines, electromagnetic holding brake failure can be both dangerous and costly. In certain applications, electromagnetic holding brakes operate as a failsafe to prevent uncontrolled yawing in wind turbines, for example, during black-outs, power-shortages, or grid failure or extreme grid events. As is described in greater detail herein, the air gap in a wind turbine brake assembly—defined and bound by the components of the brake assembly within a housing, for example—plays an important role in causing certain types of wind turbine failure. For example, if the air gap is too narrow, the compressed spring in a spring-applied holding brake does not have sufficient space between components to decompress and produce sufficient spring pressure to mechanically press a pressure plate and friction plate against a friction surface of the wind turbine. If the air gap is too broad, the electromagnet in the brake cannot generate magnetic lines of flux across the air gap to yield a magnetic field to disengage the brake, i.e., to attract and retract the pressure plate and friction plate from up against the friction surface (recompressing the springs, for example).

Therefore, in another embodiment of the present disclosure, the system of the present invention is configured to monitor change(s) associated with the air gap by: (1) receiving one or more sensor signals from the sensor(s) that are indicative of change(s) associated with the air gap; and (2) comparing the change(s) associated with the air gap to the certain thresholds to determine if the air gap is too narrow, too broad, or in need of attention.

For example, in another embodiment, the system comprises at least one proximity sensor arranged adjacent to the air gap, to monitor the air gap. In such embodiments, if the air gap is less than about 0.25 millimeters (mm) or broader than about 0.4 mm, the proximity sensor is configured to transmit the sensor signal(s) to the controller. Thus, the controller is configured to receive the sensor signal(s) indicative of the change(s) associated with the air gap. The controller also is configured to compare the change(s) associated with the air gap to one or more air gap thresholds, and to implement a control action based on this comparison, so as to prevent or minimize damage to the yaw brake assembly or wind turbine. A "control action" as used herein includes, but is not limited to, notifying and/or requesting replacement of the brake pads of the yaw brake assembly, notifying and requesting adjustment to the air gap of the yaw brake assembly, and/or directly or indirectly controlling, via the controller, the electromagnet current to more effectively and/or efficiently control the yaw brake assembly.

Referring now to the drawings, FIG. 1 illustrates perspective view of an embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in alternative embodiments, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown in the embodiment of FIG. 1, the wind turbine 10 includes a turbine control system or turbine controller 26 centralized within the nacelle 16. However, it should be appreciated that the turbine controller 26 may be disposed at any location on or in the wind turbine 10, at any location on the support surface 14 or generally at any other location. As is described below with reference to FIG. 3, the turbine controller 26 may generally comprise any suitable processing unit configured to perform the functions described herein. Thus, in several embodiments, the turbine controller 26 may include suitable computer-readable instructions that, when implemented, configure the controller 26 to perform various different actions, such as transmitting and executing wind turbine control signals, receiving and analyzing sensor signals and generating message signals to provide an indication of changes to the air gap in the brake assembly or to relative position changes and/or relative displacement between components of the brake assembly, the one or more sensors, and/or a friction surface of the wind turbine By transmitting and executing wind turbine control signals, the turbine controller 26 may generally be configured to control the various operating modes (e.g., start-up or shut-down sequences) and/or components of the wind turbine 10. For example, the controller 26 may be configured to control the yaw direction of the nacelle 16 about a yaw axis 28 to position the rotor blades 22 with respect to the direction 30 of the wind, thereby controlling the load and power output generated by the wind turbine 10. For example, as is described in greater detail herein, the turbine controller 26 may be configured to transmit control signals/commands to one or more yaw drive mechanisms 32 (FIG. 2) of the wind turbine 10 such that the nacelle 16 may be rotated about the yaw axis 28.

Figure 2:
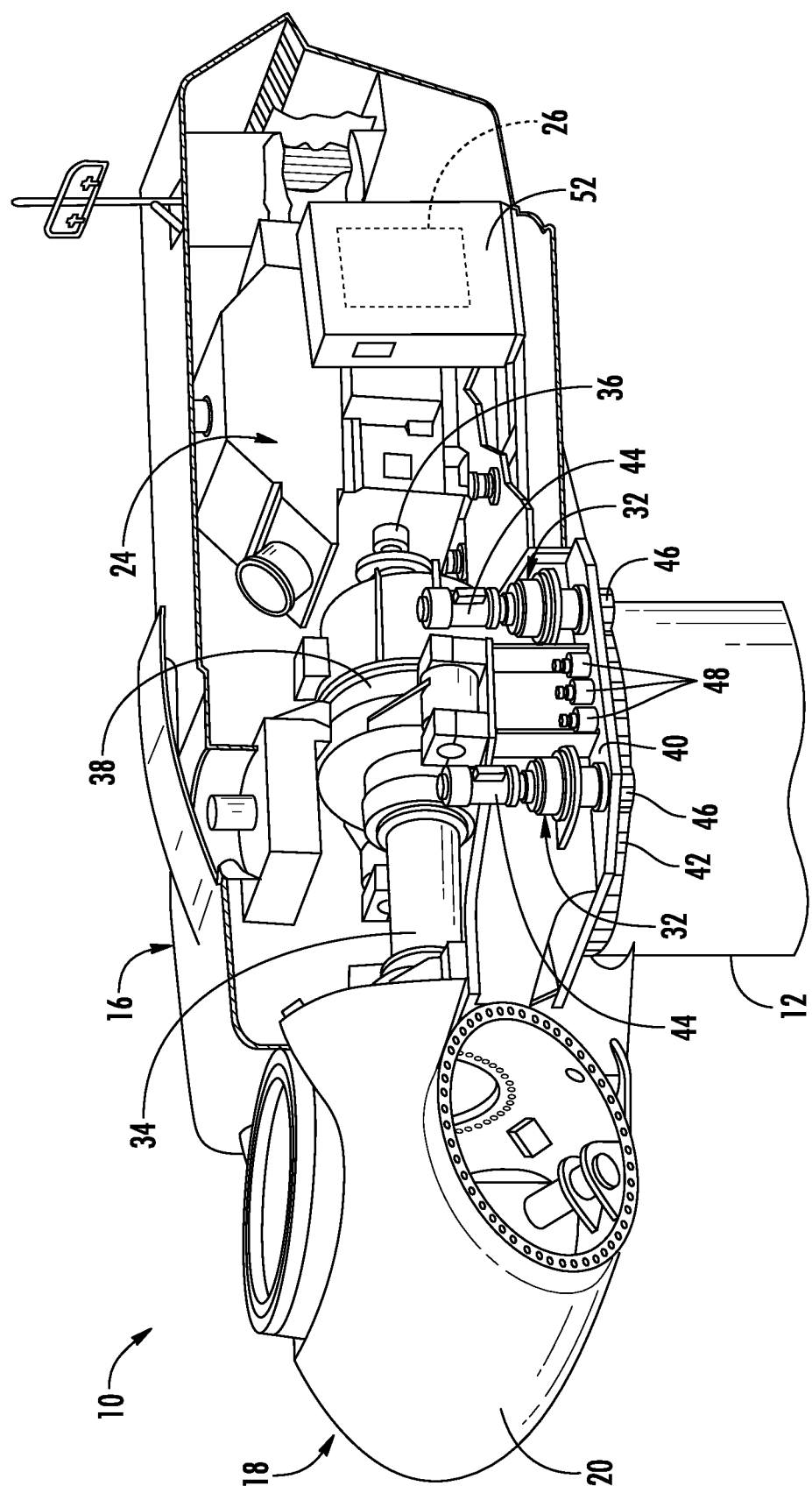
FIG. 2 illustrates a perspective, interior view of one embodiment of a nacelle of the wind turbine shown in FIG. 1.

Referring now to FIG. 2, a simplified, internal view of one embodiment of the nacelle 16 of the wind turbine 10 is illustrated. As shown, a generator 24 is disposed within the nacelle 16. In general, the generator 24 is coupled to the rotor 18 of the wind turbine 10 for generating electrical power from the rotational energy generated by the rotor 18. The rotor 18 may include a rotor shaft 34 coupled to the hub 20 for rotation therewith. The generator 24 may then be coupled to the rotor shaft 34 such that rotation of the rotor shaft 34 drives the generator 24. In the illustrated embodiment of FIG. 2, the generator 24 includes a generator shaft 36 rotatably coupled to the rotor shaft 34 through a gearbox 38. However, in other embodiments, it should be appreciated that the generator shaft 36 may be rotatably coupled directly to the rotor shaft 34. Alternatively, the generator 24 may be directly rotatably coupled to the rotor shaft 34 (often referred to as a "direct-drive wind turbine").

Additionally, the wind turbine 10 may include one or more yaw drive mechanisms 32 optionally mounted to and/or through a bedplate support frame 40 positioned atop the wind turbine tower 12. In particular, in the illustrated embodiment of FIG. 2, each yaw drive mechanism 32 is mounted to and through the bedplate support frame 40 so as to engage a yaw bearing 42 (also referred to as a slewing ring bearing or tower ring gear) of the wind turbine 10. The yaw bearing 42 is mounted to the bedplate support frame 40 such that, as the yaw bearing 42 rotates about the yaw axis 28 (see e.g., FIG. 1), the bedplate support frame 40 and, thus, the nacelle 16 are similarly rotated about the yaw axis 28 (FIG. 1).

In general, it should be appreciated that the yaw drive mechanisms 32 may have any suitable configuration and may include any suitable components known in the art to allow such mechanisms 32 to function as described herein. For example, as shown in FIG. 2, each yaw drive mechanism 32 includes a yaw motor 44 mounted to the bedplate support frame 40. The yaw motor 44 is coupled to a yaw gear 46 (e.g., a pinion gear) configured to engage the yaw bearing 42. The yaw motor 44 may be coupled to the yaw gear 46 directly (e.g., by an output shaft (not shown) extending through the bedplate support frame 40) or indirectly through a suitable gear assembly coupled between the yaw motor 44 and the yaw gear 46. As such, the torque generated by the yaw motor 44 is transmitted through the yaw gear 36 and applied to the yaw bearing 42 to permit the nacelle 16 to be rotated about the yaw axis 28. It should be appreciated that, although the illustrated wind turbine 10 is shown to include two yaw drive mechanisms 32, the wind turbine 10 may generally include any suitable number of yaw drive mechanisms 32, such as a single yaw drive mechanism 32 or more than two yaw drive mechanisms 32.

Referring still to FIG. 2, the wind turbine 10 also includes a plurality of yaw brake assemblies 48 for controlling the rotation of the nacelle 16 about the yaw axis 28. The yaw brake assemblies 48 are mounted to and/or through the bedplate support frame 40 such that a brake pad 102 (FIG. 5) of each yaw brake assembly 48 is frictionally engaged with a suitable friction surface of the wind turbine 10 (e.g., a surface of the yaw bearing 42) in order to stop, slow and/or otherwise control the rotation of the nacelle 16. It should be appreciated that the wind turbine 10 may generally include any suitable number of yaw brake assemblies 48. For instance, in one embodiment, the wind turbine 10 may include between twelve and twenty yaw brake assemblies 48. However, in other embodiments, the wind turbine 10 may include less than twelve yaw brake assemblies 48 or greater than twenty yaw brake assemblies 48.

Additionally, the turbine controller 26 may also be located within the nacelle 16. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, the turbine controller 26 may also be communicatively coupled to various components of the wind turbine 10 for generally controlling the wind turbine 10 and/or such components. For example, the turbine controller 26 may be communicatively coupled to the yaw drive mechanisms 32 such that suitable control signals may be transmitted to the yaw drive mechanisms 32 to allow the rotation of the nacelle 16 and the orientation of the rotor blades 22 to be controlled. Moreover, the turbine controller 26 may be communicatively coupled to the yaw brake assembly(ies) 48 such that suitable control signals may be transmitted to the yaw brake assembly(ies) 48 to engage or disengage the brakes.

Figure 3:
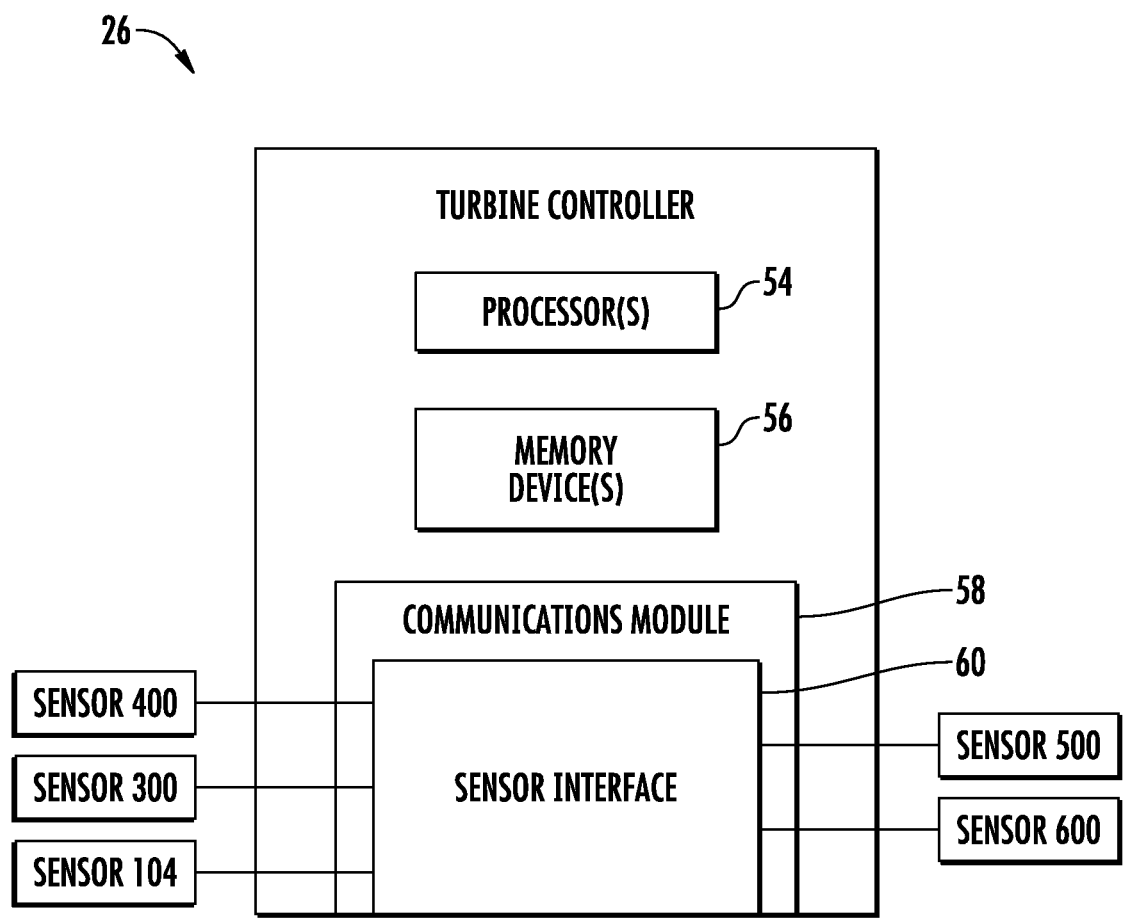
FIG. 3 illustrates a schematic diagram of one embodiment of a turbine controller of a wind turbine in accordance with aspects of the present disclosure.

Referring now to FIG. 3, there is illustrated a block diagram of one embodiment of the turbine controller 26 of the wind turbine 10. In general, the turbine controller 26 may comprise a computer or any other suitable processing unit. Thus, in several embodiments, the turbine controller 26 may include one or more processor(s) 54 and associated memory device(s) 56 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 56 of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 56 may generally be configured to store suitable computer-readable instructions that, when implemented by the processor(s) 54, configure the turbine controller 26 to perform various functions including, but not limited to, monitoring the air gap in a brake assembly of a wind turbine, determining relative position changes and/or relative displacement between components of the brake assembly, the one or more sensors, and/or a friction surface of the wind turbine, monitoring one or more changes associated with the air gap as the one or more brake plates or other components of the brake assembly or wind turbine wear or shift, and/or the like. The memory device(s) 56 may also be used to store temporary input and output variables and other immediate information during execution by the processor(s) 54 of the computer-readable instructions.

Additionally, as shown in FIG. 3, the turbine controller 26 may also include a communications module 58 configured to facilitate communication between the turbine controller 26 and the various components of the wind turbine 10 including the yaw brake assembly(ies) 48. In several embodiments, the communications module 58 may include a sensor interface 60 to permit any sensors 104, 300, 400, 500, and 604 (see also e.g., FIGS. 5-15) of the wind turbine 10 to communicate with the turbine controller 26. For instance, the sensor interface 60 may comprise one or more analog-to-digital converters configured to convert analog signals into digital signals that can be used by the processor(s) 54.

Figure 4:
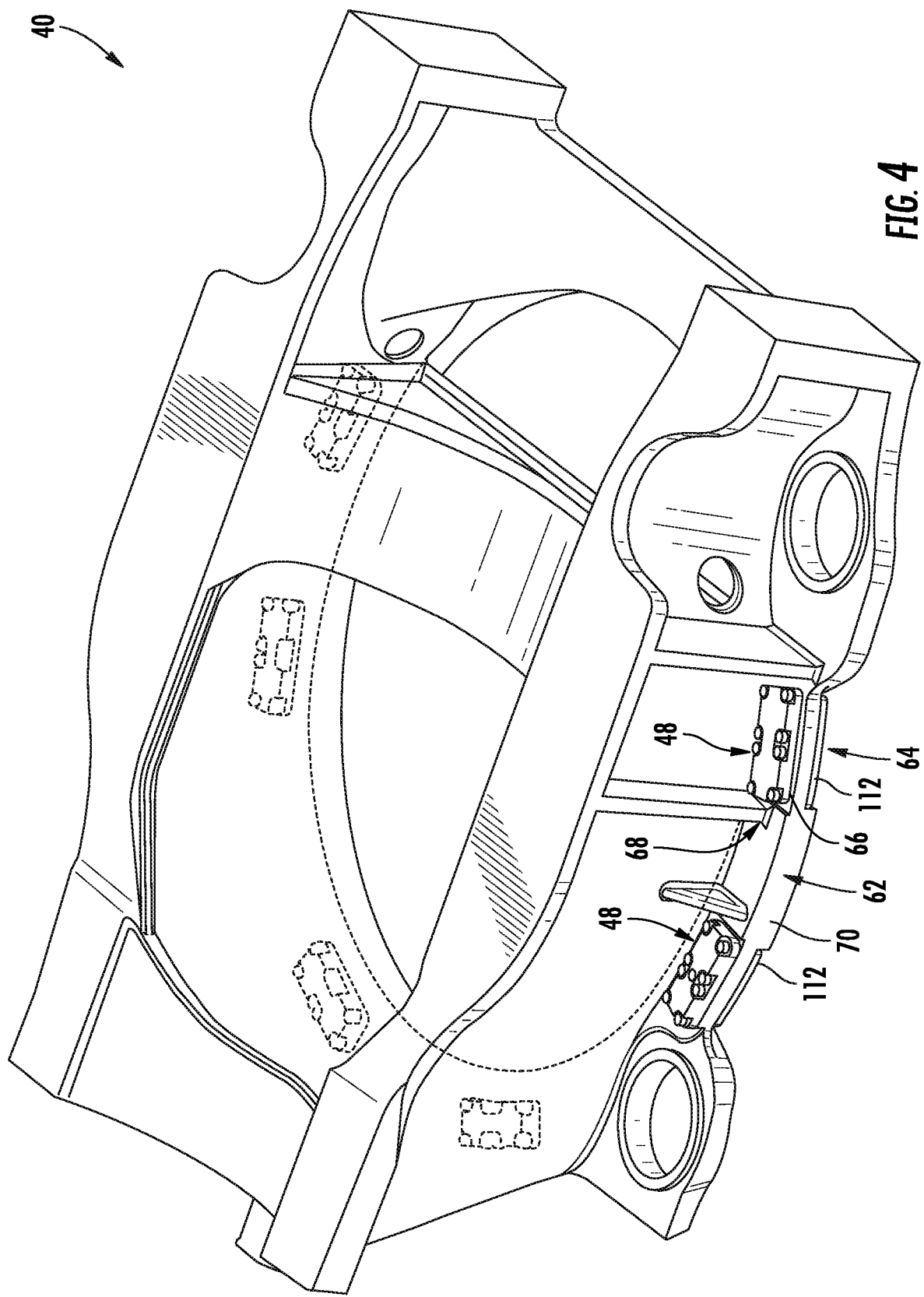
FIG. 4 illustrates a perspective view of an embodiment of a bedplate support frame for utilization with a yaw brake assembly according to the present disclosure.

Referring now to FIG. 4, there is illustrated an embodiment of the bedplate support frame 40 described herein according to the present disclosure. In particular, as shown, the bedplate support frame 40 includes an annular flange 62. The annular flange 62 is arranged adjacent to the yaw bearing 42 along the yaw bearing interface. The annular flange 62 defines a plurality of recesses 64 formed into a lower-most annular surface 66 of the annular flange 62. The plurality of recesses 64 extend at least partially through an axial thickness of the annular flange 62. Each of the plurality of recesses 64 defines an opening 68 in an exterior circumferential side 70 of the annular flange 62.

Furthermore, the yaw brake assembly 48 also includes one or more brake pads 102 (FIG. 5) positioned within the plurality of recesses 64. Thus, the brake pad(s) 102 are configured to engage at least one race of the yaw bearing 42. For example, in an embodiment, the brake pad(s) 102 may be radially aligned with the outer race of the yaw bearing 42. Additionally, the yaw brake assembly 48 may include an optional plurality of actuators for driving the brake pads 102 to engage the yaw bearing 42 and resist a yawing of the nacelle 106 of the wind turbine 100.

Figure 5:
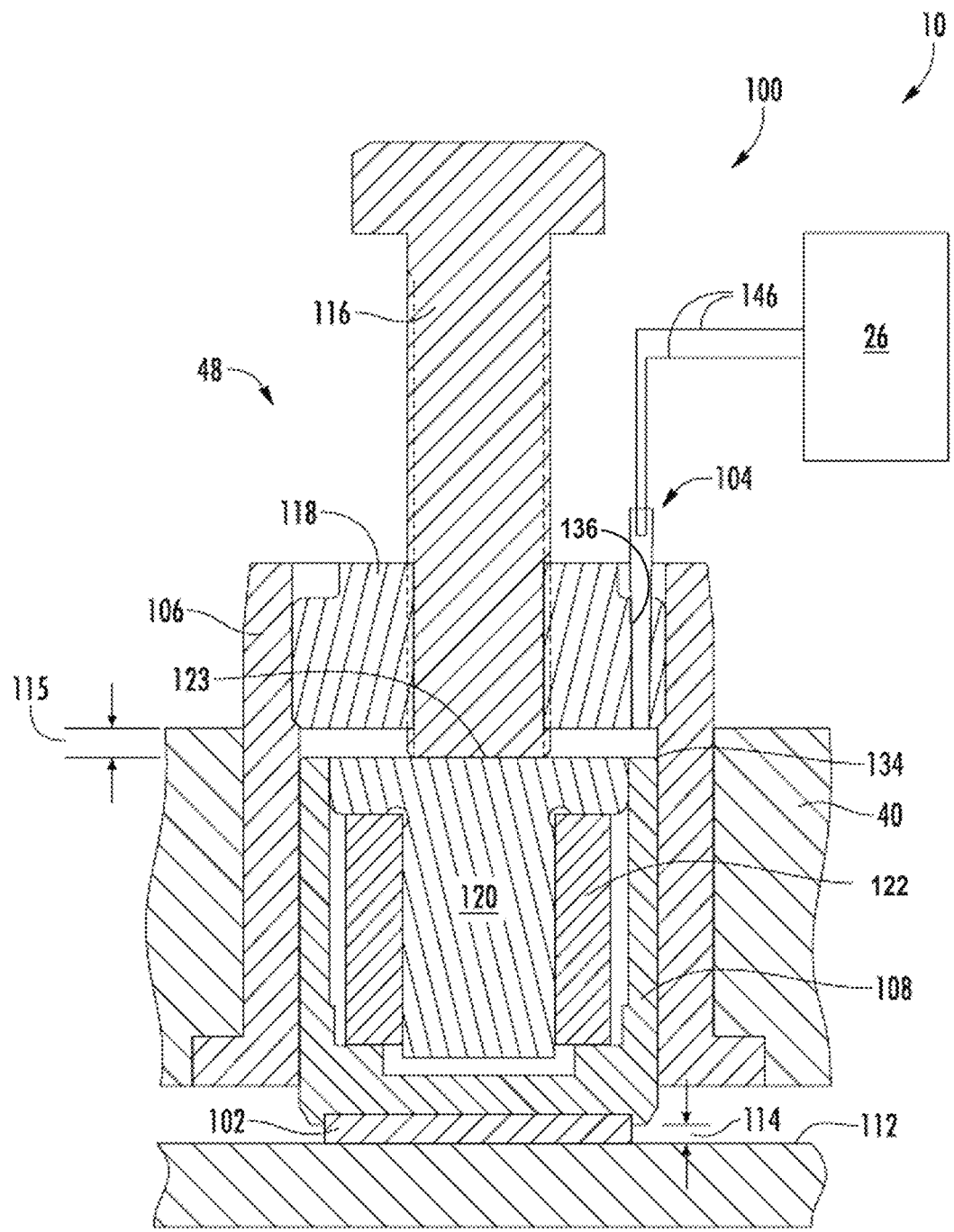
FIG. 5 illustrates a cross-sectional view of an embodiment of a system for actively monitoring an air gap of a yaw brake assembly of a wind turbine in accordance with aspects of the present disclosure.

Referring now to FIG. 5, a cross-sectional view of an embodiment of a system 100 for actively monitoring an air gap 115 in a yaw brake assembly 48 of a wind turbine 10 is illustrated in accordance with aspects of the present disclosure. In particular, as shown, the system 100 includes at least one sensor 104 that may be installed within the yaw brake assembly 48 in accordance with aspects of the present disclosure. It should be appreciated that the system 100 and the sensor(s) 104 disclosed herein may generally be utilized with yaw brake assemblies having any suitable configuration known in the art. Thus, it should be appreciated that the configuration of the yaw brake assembly 48 shown in FIG. 5 is only provided as a non-limiting example of a suitable brake configuration with which the sensor 104 may be advantageously used.

Furthermore, as shown, the yaw brake assembly 48 of FIG. 5 generally includes an outer casing 106 mounted within the bedplate support frame 40 of the nacelle 16, a brake piston 108 movably disposed within the outer casing 106 and the brake pad 102 secured to the bottom of the brake piston 108. The brake piston 108 may generally be configured to be pushed or pressed against a friction surface 112 of the wind turbine 10 such that the brake pad 102 is maintained in frictional engagement with the friction surface 112 as the bedplate support frame 40 and nacelle 16 are rotated about the yaw axis 28. For example, in an embodiments, the brake piston 108 is configured to be pushed or pressed in the direction of the friction surface 112 in order to maintain a constant frictional force between the brake pad 102 and the friction surface 112. Thus, as the usable width 114 of the brake pad 102 is reduced due to wear, the position of the brake piston 108 within the outer casing 106 shifts downwardly (i.e., in the direction of the friction surface 112) in order to maintain the desired frictional force between the brake pad 102 and the friction surface 112.

It should be appreciated that the illustrated friction surface 112 may generally include the surface of any suitable wind turbine component that permits the rotation of the nacelle 16 to be stopped, slowed and/or otherwise controlled upon application of a frictional force against such surface. For example, in an embodiment, the friction surface 112 may include a surface of the yaw bearing 42. In another embodiment, the friction surface 112 may include a surface of a brake disk 214 (FIGS. 6 and 7) configured to be coupled to the yaw bearing 42.

It should also be appreciated that the yaw brake assembly 48 may generally include any suitable structure and/or means for pushing or pressing the brake piston 108 against the friction surface 112 such that the brake pad 102 is maintained in sliding engagement with the friction surface 112. For example, as shown in the illustrated embodiment of FIG. 5, the yaw brake assembly 48 includes a bolt 116 threaded into a corresponding threaded bushing 118 mounted within the outer casing 106. In such embodiments, the bolt 116 is configured to apply a downward force against a thrust piece 120 movably disposed with the brake piston 108. The thrust piece 120, in turn, is configured to transmit the downward force applied by the bolt 116 to the brake piston 108, thereby pushing the brake piston 108 towards the friction surface 112. For instance, as shown in FIG. 5, a spring and/or other suitable biasing mechanism(s) 122 is disposed between the thrust piece 120 and the brake piston 108. Accordingly, as the bolt 116 is screwed into the threaded bushing 118, an end 123 of the bolt 116 applies a downward force against the thrust piece 120, which is then translated through the biasing mechanism(s) 122 to the brake piston 108. As a result, the brake piston 108 is pushed or pressed downwardly, thereby maintaining the brake pad 102 in sliding engagement with the friction surface 112.

In other embodiments, the brake piston 108 may be pushed or pressed within the outer casing 106 against the friction surface 112 using any other suitable means known in the art. For example, the brake piston 108 may be coupled to a hydraulic cylinder, a pneumatic cylinder, an electromagnetic solenoid or motor, other electro-magnetically actuated devices, and/or any other suitable displacement mechanism or actuation device configured to apply a force against the brake piston 108, thereby pushing or pressing the brake piston 108 in the direction of the friction surface 112.

Figure 8:
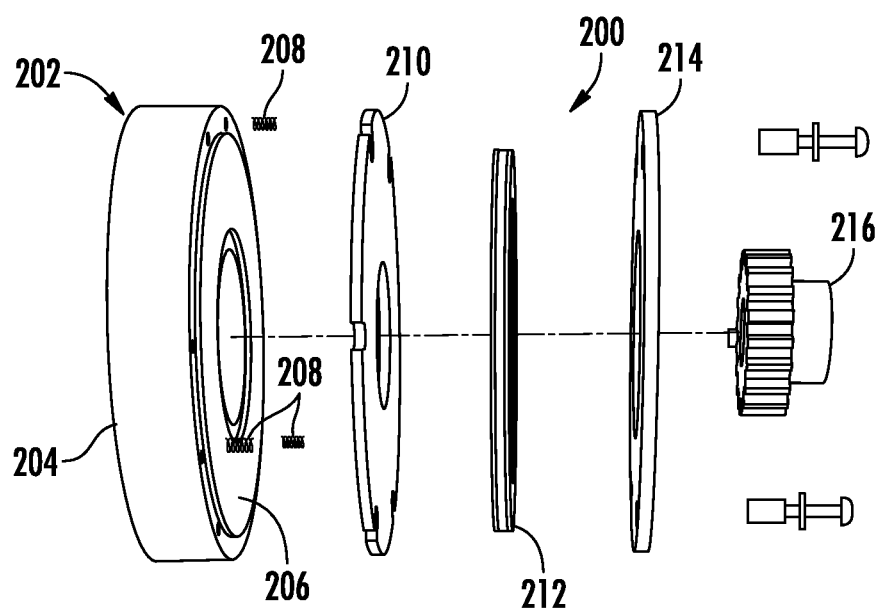
FIG. 8 illustrates another exploded perspective view of the yaw brake assembly of FIG. 6.

Referring still to FIG. 5, the sensor(s) 104 of the system 100 is configured to monitor one or more changes associated with the air gap 115 in the yaw brake assembly 48, for example, to detect brake pad wear. In particular, in an embodiment, the sensor(s) 104 may be configured to sense the position change, shift, and/or displacement of a movable component of the yaw brake assembly 48 relative to another component of the yaw brake assembly 48 (e.g., the outer casing 106 or a brake housing as shown in FIG. 8), another component of the wind turbine 10 and/or the friction surface 112. As used herein, the term "movable component" refers to any component of the yaw brake assembly 48 that is configured to move relative to the friction surface 112 as the brake pad 102 wears. For example, movable components may include yaw brake assembly components that are directly or indirectly attached to the brake pad 102 so that the changes in position or the displacement of such components provide an indication of the reduction in usable width 114 of the brake pad 102, and an indication of one or more changes to the air gap 115.

Thus, in the illustrated embodiment, a movable component of the yaw brake assembly 48 may include the brake piston 108, as the change in position or displacement of the brake piston 108 within the outer casing 106 provides a direct indication of brake pad 102 wear. In other embodiments, the movable components of the yaw brake assembly 48 may include, but are not limited to, components directly attached to the brake piston 108, other components of the yaw brake assembly 48 to which a force is applied in order to maintain the brake pad 102 in frictional engagement with the friction surface 112 (e.g., the pressure plate 210 shown in FIG. 10, and the pressure plate with caliper-type configuration shown in FIG. 15) and/or any other suitable components that may change their position and/or be displaced as a result of brake pad 102 wear, for example.

Thus, the term "air gap" as used herein refers to any component of the yaw brake assembly 48 that is defined or bound, at least in part, by a movable component(s). For example, in the illustrated embodiment, the air gap 115 is situated between one or more brake plates 102 and the outer casing 106 of the yaw brake assembly 48. In another embodiment, the air gap 115 may be situated between other components of the yaw brake assembly 48 or the wind turbine 10, e.g., between the brake housing 204 and the pressure plate 210 as shown in FIGS. 6-15.

Referring still to FIG. 5, the sensor(s) 104 of the system 100 may be a distance sensor, a proximity sensor, a temperature sensor, or any other sensor configured to monitor one or more changes associated with the air gap 115, or configured to directly or indirectly sense relative position changes and/or relative displacement between components of the yaw brake assembly 48 and/or the friction surface 112 of the wind turbine 10. In the illustrated embodiment, for example, the sensor 104 is a proximity sensor situated and orientated tangential to the thrust piece 120 and the brake piston 108, on the opposite side of the air gap 115, to monitor relative position changes and/or relative displacement between components of the yaw brake assembly 48. Thus, in the illustrated embodiment, as the brake pad 102 wears and the brake piston 108 moves downward within the outer casing 106, the proximity sensor 104 senses the displacement and relative position change and provides an indication of the change and or implements a response/control action.

In general, the sensor(s) 104 may be configured to be rigidly mounted within the yaw brake assembly 48 at any suitable location using any suitable means that allows the sensor 104 to be maintained in proper positioning and orientation relative to the movable component of the yaw brake assembly 48 (e.g., the brake piston 108 for the FIG. 5 embodiment). For example, as shown in the illustrated embodiment, the sensor 104 may be mounted within an opening 136 defined in the threaded bushing 118 at a location directly above the top surface 134 of the brake piston 108. As such, when the proximity sensor 104 is installed within the opening 136, the proximity sensor 104 may have a direct line of sight with the top surface 134.

It should be appreciated that the sensor 104 may be rigidly secured within the opening 136 using any suitable means. For example, in one embodiment, the sensor 104 may be welded to a portion of the threaded bushing 118. In another embodiment, both the opening 136 and an outer surface of the sensor 104 may be threaded such that the sensor 104 may be screwed into the opening 136. In a further embodiment, suitable fastening mechanisms (e.g., bolts, screws, pins, rivets, brackets and/or the like) may be used to secure the sensor 104 within the opening 136. It should also be appreciated that, in one embodiment, the opening 136 may comprise a pre-existing opening of the yaw brake assembly 48. For example, the opening 136 may correspond to a pre-existing inspection port of the yaw brake assembly 48 used to visually inspect the brake assembly 48 or used for maintaining or repairing the biasing means 122 (see e.g., FIG. 14).

Referring still to FIG. 5, and as described in detail herein, the system 100 may also include the turbine controller 26 or a separate controller. Thus, the sensor(s) 104 of the system 100 may be configured to be communicatively coupled to the turbine controller 26 such that output signals from the sensor 104 may be transmitted to the turbine controller 26. For example, as shown in the illustrated embodiment, the sensor(s) 104 may be communicatively coupled to the turbine controller 26 through a wired connection, such as by coupling the sensor 104 to the turbine controller 26 through a cable and/or other suitable communication link 146. As such, signals generated by the sensor(s) 104 may be directly transmitted to the turbine controller 26 for subsequent processing. However, in an alternative embodiment, the sensor(s) 104 may be communicatively coupled to the turbine controller 26 through a wireless connection. For instance, the sensor 104 may include or may be coupled to an antenna (not shown) configured to transmit suitable signals to the turbine controller 26 through any suitable wireless communications protocol.

In the illustrated embodiment, the sensor(s) 104 is configured to provide data and/or signals associated with displacement or relative position changes. In such an embodiment, the displacement and/or position data/signals may be periodically captured and transmitted to the turbine controller 26 to allow for continuous or active monitoring of the wear or changes occurring to the yaw brake assembly 48. For example, displacement and/or position measurements captured by the sensor(s) 104 may be stored within and analyzed by the turbine controller 26 to evaluate air gap 115 trends and/or to provide a means for predicting maintenance intervals or adjustment tables. The sensor(s) 104 of the system 100 may include, but are not limited to, linear displacement sensors, proximity sensors, linear potentiometers, string potentiometers, position transducers, linear position sensors, laser position sensors, gage sensors and/or other contact and non-contact position sensors.

It should be appreciated that, by actively monitoring one or more changes to the air gap 115 using the sensor(s) 104 described herein, and by transmitting appropriate signals to the turbine controller 26, the turbine controller 26 may be configured to perform various functions including, but not limited to, notifying and requesting adjustment to the air gap 115 from an end user, and/or directly or indirectly controlling components of the yaw brake assembly 48. For example, in the illustrated embodiment, the controller 26 is configured to transmit control signals for adjusting the brake piston 108 of the yaw brake assembly to re-establish frictional engagement with the friction surface 112 as the brake pad 102 wears and the air gap 115 changes. In another embodiment, the controller 26 is configured to transmit control signals for adjusting the electromagnetic coil 206 as described herein in relation to FIGS. 6-15. In other embodiments, the controller 26 may be configured notify a wind turbine operator and/or the turbine monitoring system of the wind turbine 10 when one or more changes to the air gap 115 are indicative of needing to replace one or more of the brake pads 102, and/or when any other suitable maintenance operation needs to be performed on one or more of the yaw brake assemblies 48.

For example, the turbine controller 26 may be provided with suitable computer-readable instructions that configure the controller 26 to generate a message signal based on the signals received from the sensor(s) 104. Thus, in the illustrated embodiment, the turbine controller 26 may be configured to generate a message signal upon a detection by the sensor(s) 104, thereby indicating that the air gap 115 has exceeded one or more thresholds. The message signal may then be transmitted by the turbine controller 26 and thus to a wind turbine operator or the turbine monitoring system to indicate that a maintenance operation needs to be performed and/or scheduled. For example, in one embodiment, the message signal may be transmitted to a suitable computer or control panel and displayed to the wind turbine operator as a message window on the computer's display screen or a flashing light on the control panel.

Figure 6:
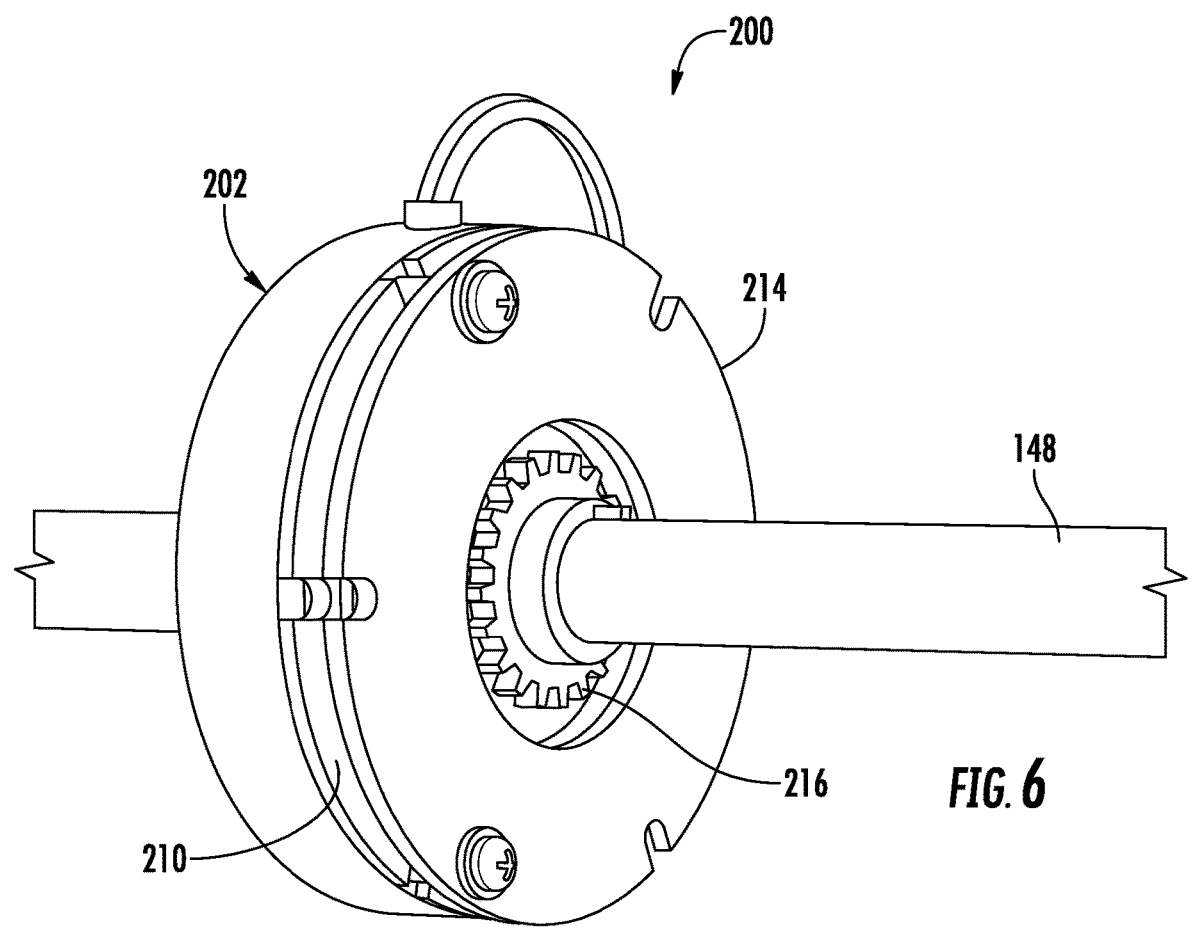
FIG. 6 illustrates a perspective view of an embodiment of a yaw brake assembly of a wind turbine configured as a spring-applied electromagnetic holding brake for a rotating shaft according to the present disclosure.
Figure 7:
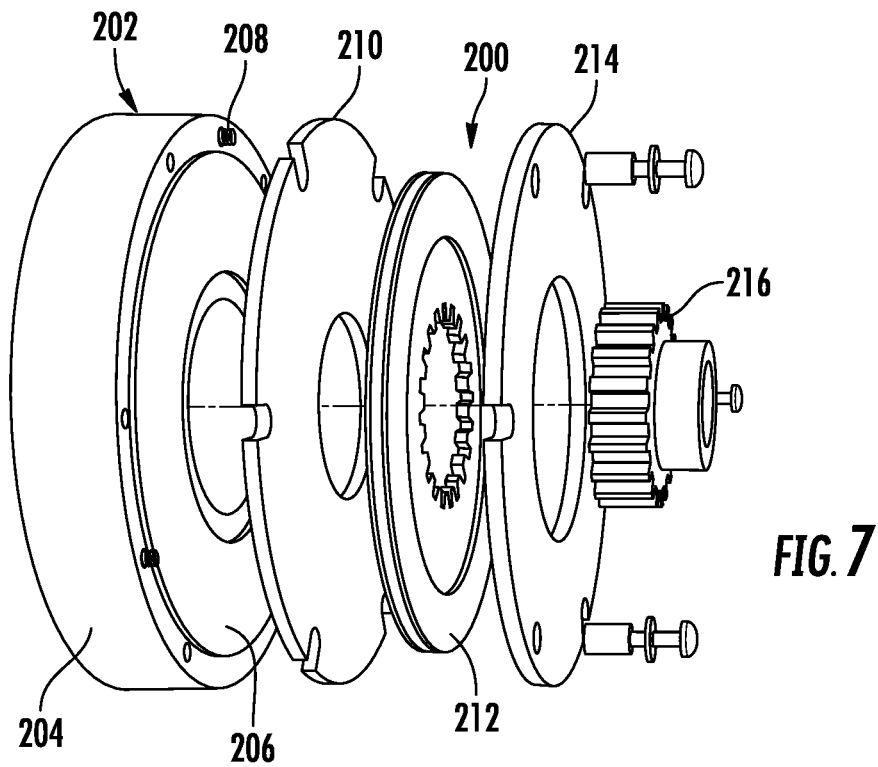
FIG. 7 illustrates an exploded perspective view of the yaw brake assembly of FIG. 6.
Figure 9:
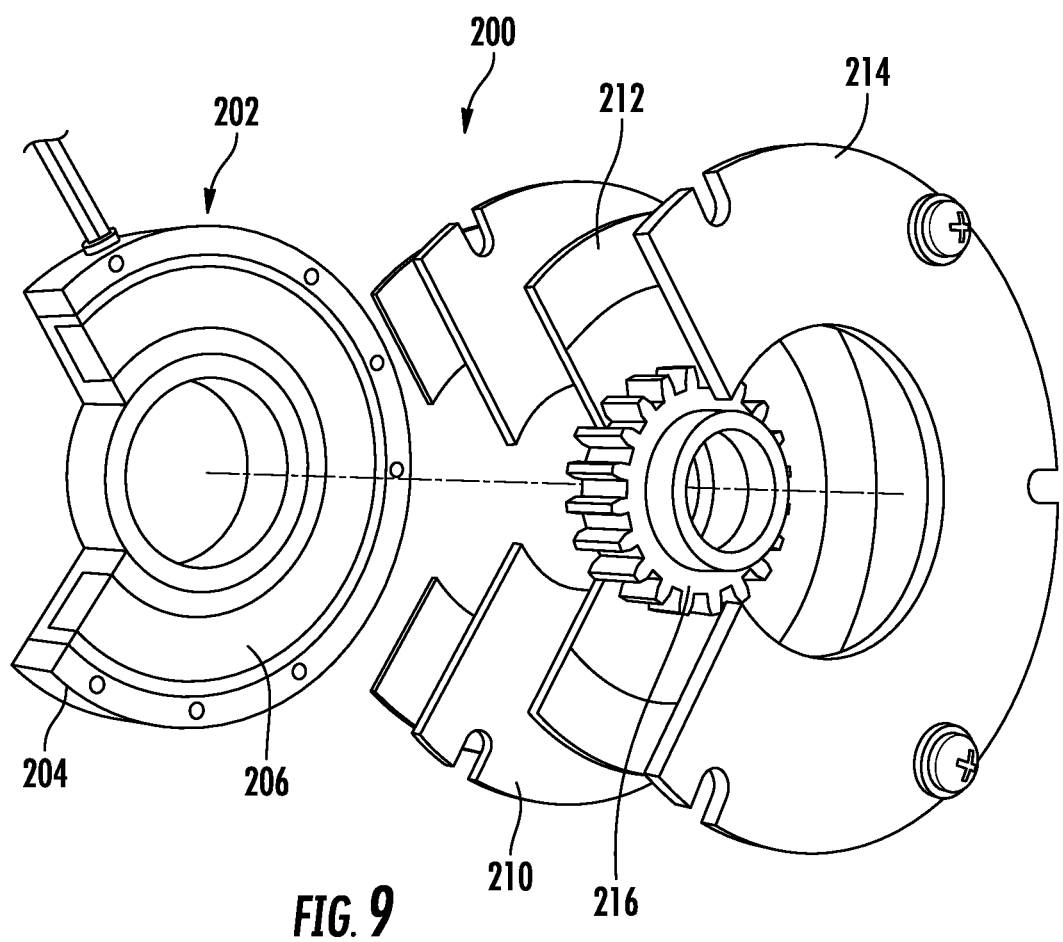
FIG. 9 illustrates an exploded, partial sectional perspective view of the yaw brake assembly of FIG. 6, particularly illustrating an embodiment of a brake body including a brake housing and an electromagnetic coil.

Referring now to FIGS. 6-9, another embodiment of a yaw brake assembly 200 is illustrated according to the present disclosure. In particular, FIG. 6 illustrates an embodiment of a yaw brake assembly 200 configured as a spring-applied electromagnetic holding brake for a rotating shaft 148 according to the present disclosure. FIGS. 7 and 8 illustrate exploded perspective views of the yaw brake assembly 200 of FIG. 6. FIG. 9 illustrates an exploded, partial sectional perspective view of a brake body 202 of the yaw brake assembly 200 of FIG. 6, particularly illustrating a brake housing 204 and an electromagnetic coil 206. In particular, the brake assembly 200 includes the brake body 202, a spring set 208, a pressure plate 210, a brake pad 212 configured as a friction disk, a brake housing cover plate 214, and a hub system 216 for mechanically engaging a shaft 148 (such as shaft 34 of FIG. 2) to the brake assembly 200. For example, as shown in the illustrated embodiment, the brake housing 204 secures the coil 206 and sandwiches the other components of the brake assembly 200 with the brake housing cover plate 214. It should also be appreciated that the brake housing 204 and the brake housing cover plate 214, and/or any other corresponding component of the brake assembly 200 sandwiched therebetween, may include any suitable structure and/or means for holding the components of the yaw brake assembly 200 together.

Referring still to the illustrated embodiment of FIGS. 6-9, the hub system 216 may also include a gear and a key. The hub system gear 216 has a key groove, and the key groove corresponds to a key groove on the shaft 148. The key is configured for introduction into the key grooves—when aligned—to mechanically engage the hub system 216 to the shaft 148. The hub system gear 216 also has splines corresponding to splines on the brake pad/friction disk 212 to mechanically engage the hub system 216 to the brake pad/friction disk 212. It should be appreciated that the hub system 216 may generally include any suitable structure and/or means for mechanically engaging to the friction disk 212. In certain embodiments, there is no need for a key groove or key.

Figure 10:
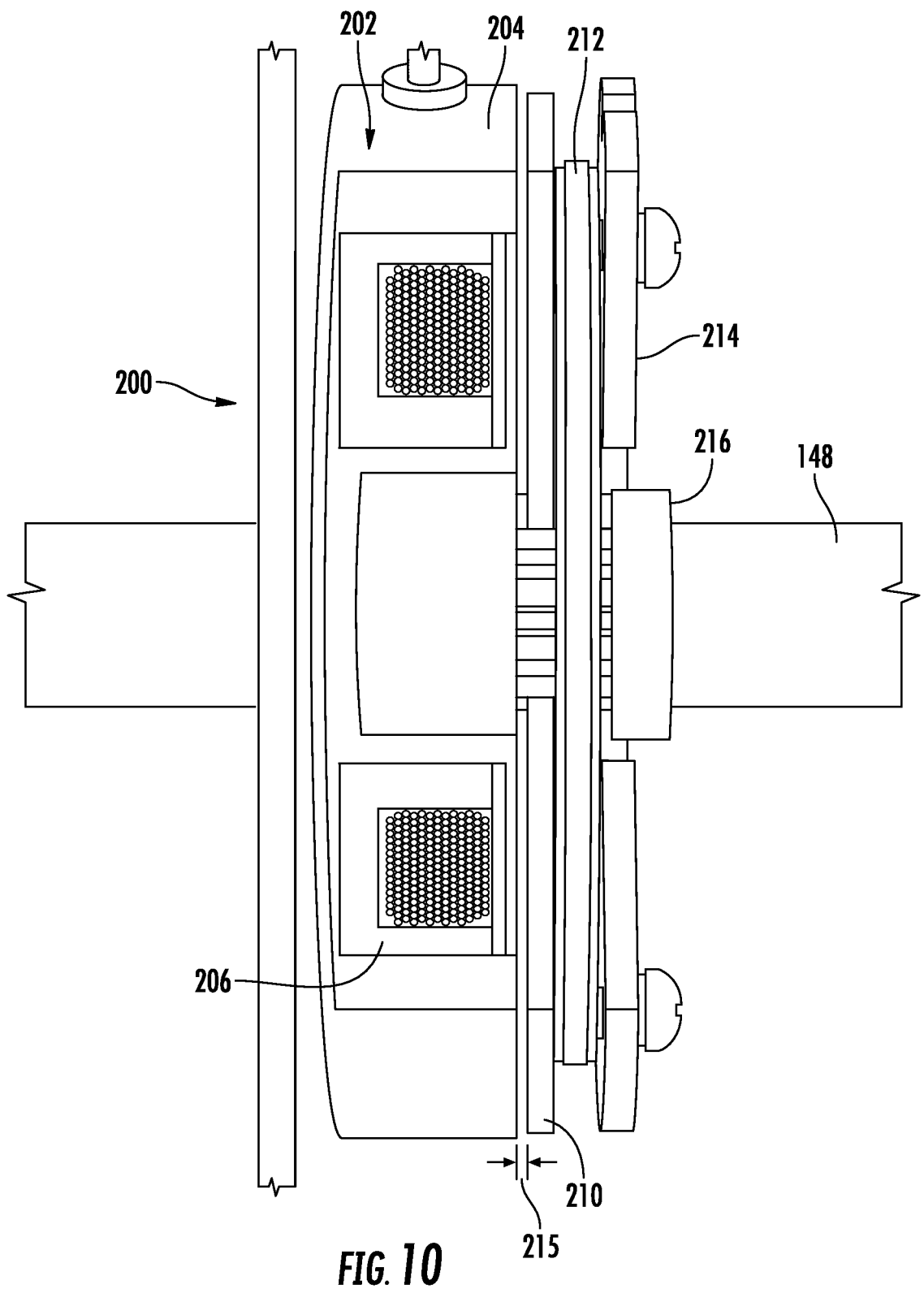
FIG. 10 illustrates a cross-sectional view of the yaw brake assembly of FIG. 6 when passively engaged.

Referring still to FIGS. 6-9, the friction disk 212 with attached shaft 148 is sandwiched between the brake body 202 and the brake housing cover plate 214. Also sandwiched between the brake body 202 and the brake housing cover plate 214 is the spring set 208 and the pressure plate 210. In particular, the friction disk 212 with attached shaft 148 is sandwiched between the pressure plate 210 and the brake housing cover plate 214, and the spring set 208 is sandwiched between the brake body 202, specifically, the brake housing 204, and the pressure plate 210. As such, when the yaw brake assembly 200 is fully assembled, the shaft 148—engaged to the hub system 216 and the friction disk 212—extends through the brake body 202, the pressure plate 210, and the brake housing cover plate 214. Moreover, the spring set 208 situated between the brake housing 204 and the pressure plate 210 pushes the pressure plate 210 away from the brake housing 204 and into the friction disk 212 (creating an air gap 215 as shown in FIG. 10), which in turn presses the friction disk 212 into the brake housing cover plate 214, which restricts any rotation of the friction disk 212. In this way, the yaw brake assembly 200 is configured as a spring-applied electromagnetic holding brake. It should be appreciated that the configuration of the yaw brake assembly 200 are only provided as non-limiting examples of a suitable brake configuration with which the sensor described herein may be used.

Figure 11:
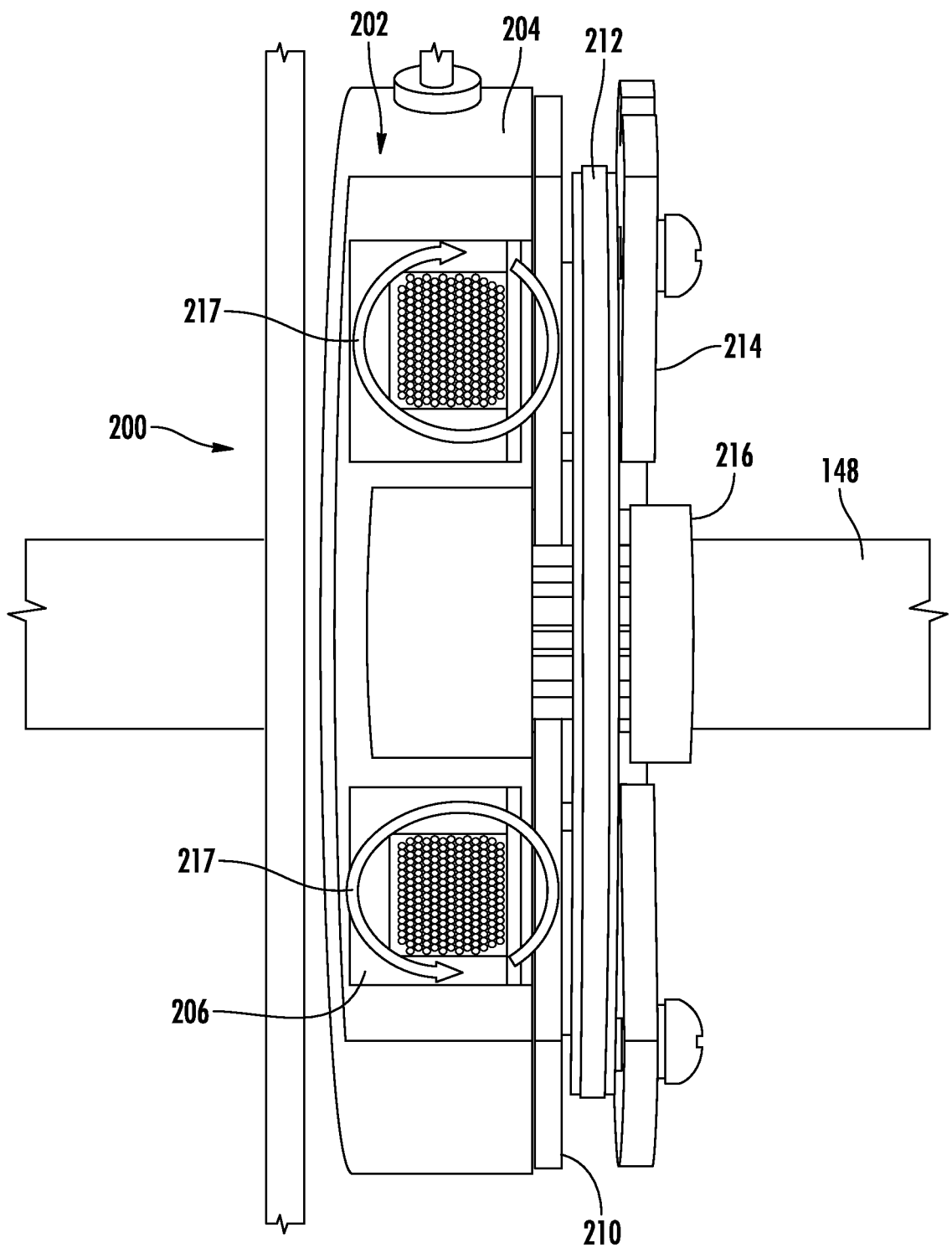
FIG. 11 illustrates a cross-sectional view of the yaw brake assembly of FIG. 6 when actively disengaged.

Referring now to FIGS. 10 and 11, a cross-sectional view of the yaw brake assembly 200 and the shaft 148 is illustrated. In particular, FIG. 10 illustrates the brake assembly 200 when passively engaged. As described in detail herein, the air gap 215 is bound, at least in part, by the brake body 202 and the pressure plate 210. In its passive state, the brake assembly 200 is engaged via persistent spring pressure from the spring set 208. Therefore, the brake assembly 200 is configured to stop and hold the shaft 148 from rotating. If there is a position change, shift, warp, deformation, thermal expansion or contraction, and/or displacement of a component of the brake assembly 200 relative to another component of the yaw brake assembly 200 (or any external contamination and debris introduced between components), the relative distance between the brake body 202 and the pressure plate 210 of the air gap 215 will either increase or decrease. If the air gap becomes too narrow, the spring set 208 cannot produce sufficient spring pressure to mechanically press the pressure plate 210 against the friction disk 212. If the air gap 215 is too broad, the electromagnetic coil 206 of the brake body 202 cannot generate magnetic lines of flux across the air gap 215 to yield a magnetic field to disengage the yaw brake assembly 200, i.e., to attract and retract the pressure plate 210 from up against the friction disk 212 to release the friction disk 212 from being pressed between the pressure plate 210 and the brake housing cover plate 214.

FIG. 11 illustrates the yaw brake assembly 200 when actively disengaged. Specifically, when a current is applied to the electromagnetic coil 206, the coil 206 produces the magnetic field 217 to attract and retract the pressure plate 210 from up against the friction disk 212, which closes the air gap 215 and releases the friction disk 212 from being pressed between the pressure plate 210 and the brake housing cover plate 214.

Figure 12:
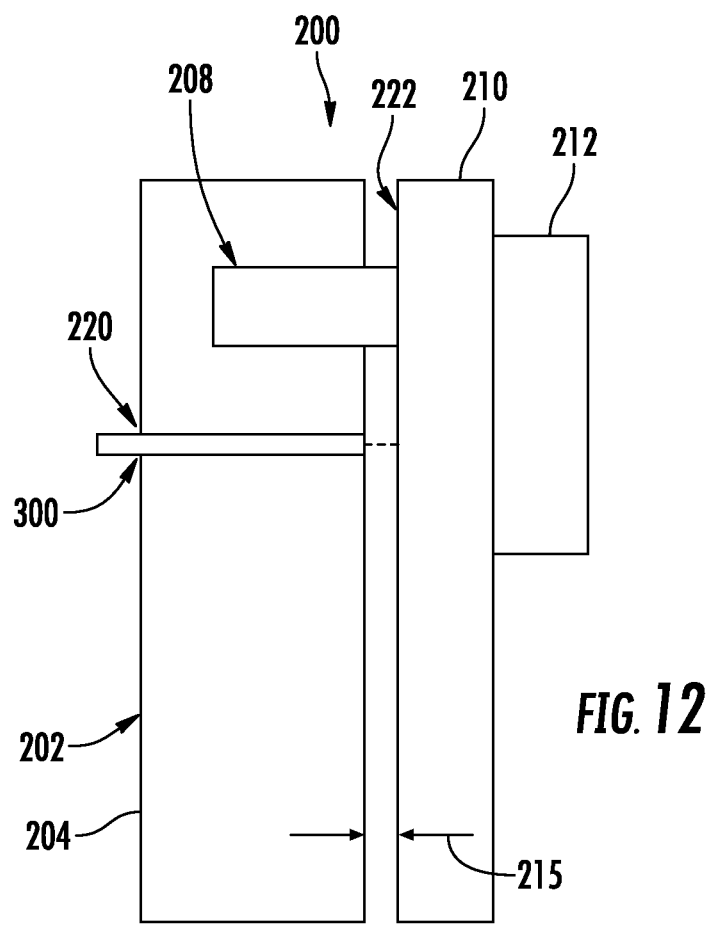
FIG. 12 illustrates a side view of another embodiment of a system for actively monitoring an air gap of a yaw brake assembly of a wind turbine in accordance with aspects of the present disclosure, particularly illustrating the system having a proximity sensor.

Referring now to FIG. 12, another embodiment of a sensor 300 for actively monitoring the air gap in a yaw brake assembly 200 of a wind turbine 10 is illustrated in accordance with aspects of the present disclosure. In particular, FIG. 12 illustrates a side view of the yaw brake assembly 200 with the sensor 300 installed. More particularly, in such embodiments, the sensor 300 is a proximity sensor. It should be appreciated that the proximity sensor 300 disclosed herein may generally have any suitable configuration known in the art.

As shown, the proximity sensor 300 is positioned through the brake housing 204 of the brake body 202 to directly or indirectly sense relative position changes and/or relative displacement between components of the yaw brake assembly 200 of the wind turbine 10. In particular, in the illustrated embodiment, the proximity sensor 300 is mounted within an opening 220 defined by the brake housing 204 at a location directly above the first surface 222 of the pressure plate 210. As such, when the proximity sensor 300 is mounted within the brake housing 204, the proximity sensor 300 has a direct view to the first surface 222 of the pressure plate 210. In this way, the proximity sensor 300 is configured to be rigidly mounted within and/or on the yaw brake assembly 200 at any suitable location using any suitable means that allows the sensor 300 to be maintained in proper positioning and orientation relative to the pressure plate 210 as the movable component of the yaw brake assembly 200.

In certain embodiments, as the brake pad/friction disk 212 wears and the pressure plate 210 shifts further away from the brake body 202 due to the spring pressure, the proximity sensor 300 is configured to detect the displacement and relative position change of the air gap 215 and provides an indication of the change to the controller 26 and/or can implement a response/control action in response to that detected change. Specifically, in an embodiment, the controller 26 is configured to receive one or more sensor signals from the at least one proximity sensor 300 indicative of one or more changes associated with the air gap 215, compare the one or more changes associated with the air gap 215 to one or more thresholds, and implement a control action based on the comparison of the one or more changes associated with the air gap 215 to the one or more thresholds so as to prevent or minimize damage.

In an embodiment, for example, if the controller 26 determines/calculates a relative distance less than about 0.25 mm or a relative distance broader than about 0.4 mm, the controller 26 is configured to implement a control action based on this comparison. In another embodiment, if the controller 26 determines/calculates a relative distance narrower than about 0.15 mm or a relative distance broader than about 0.6 mm, the controller 26 is configured to implement a control action. In another embodiment, if the controller 26 determines/calculates a relative distance narrower than about 0.10 mm or a relative distance broader than about 0.8 mm, the controller 26 is configured to implement a control action.

Figure 13:
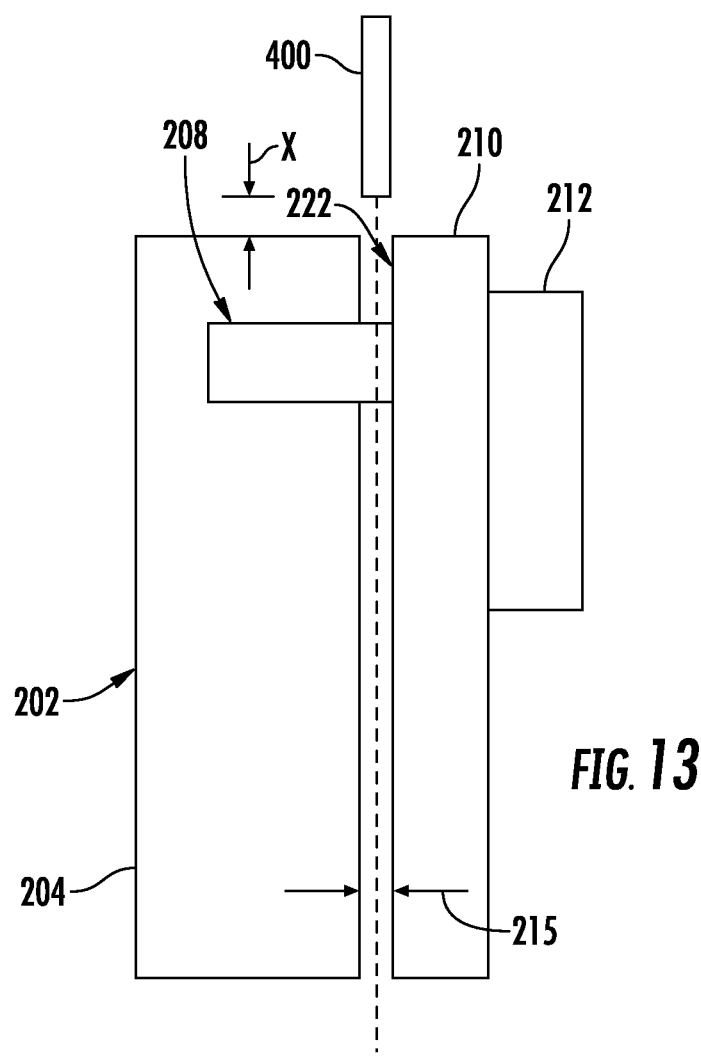
FIG. 13 illustrates a side view of still another embodiment of a system for actively monitoring an air gap of a yaw brake assembly of a wind turbine in accordance with aspects of the present disclosure, particularly illustrating the system having an optical sensor.

Referring now to FIG. 13, another embodiment of a sensor 400 for actively monitoring the air gap 215 in a yaw brake assembly 200 of a wind turbine 10 is illustrated in accordance with aspects of the present disclosure. In particular, FIG. 13 illustrates a side view of the yaw brake assembly 200 with the sensor 400 installed. In the illustrated embodiment, for example, the sensor 400 is an optical proximity sensor. It should be appreciated that the optical sensor 400 disclosed herein may generally have any suitable configuration known in the art.

As shown, the optical sensor 400 is positioned adjacent the brake body 202 (for example, on or through the bedplate support frame 40) to directly or indirectly sense relative position changes and/or relative displacement between components of the yaw brake assembly 200 of the wind turbine 10. In particular, in the illustrated embodiment, the optical sensor 400 is embedded within the bedplate support frame 40 (FIG. 4) at a location in line with and parallel to the first surface 222 of the pressure plate 210. As such, when the optical sensor 400 is installed within the bedplate support frame 40, the optical sensor 400 is in line with the air gap 215 that lies between the brake body 202 and the pressure plate 210. In this way, the optical sensor 400 is configured to be rigidly mounted within the wind turbine 10 adjacent to the yaw brake assembly 200 at any distance X away from the brake body 202 at any suitable location using any suitable means that allows the optical sensor 400 to be maintained in proper positioning and orientation relative to the movable component(s) of the yaw brake assembly 200. In certain embodiments, as the brake pad/friction disk 212 wears and the pressure plate 210 shifts further away from the brake body 202 due to the spring pressure, the optical sensor 400 via the controller 26 senses the displacement and relative position change and provides an indication of the change to the air gap 215 and or implements a response/control action in response to that detected change.

Figure 14:
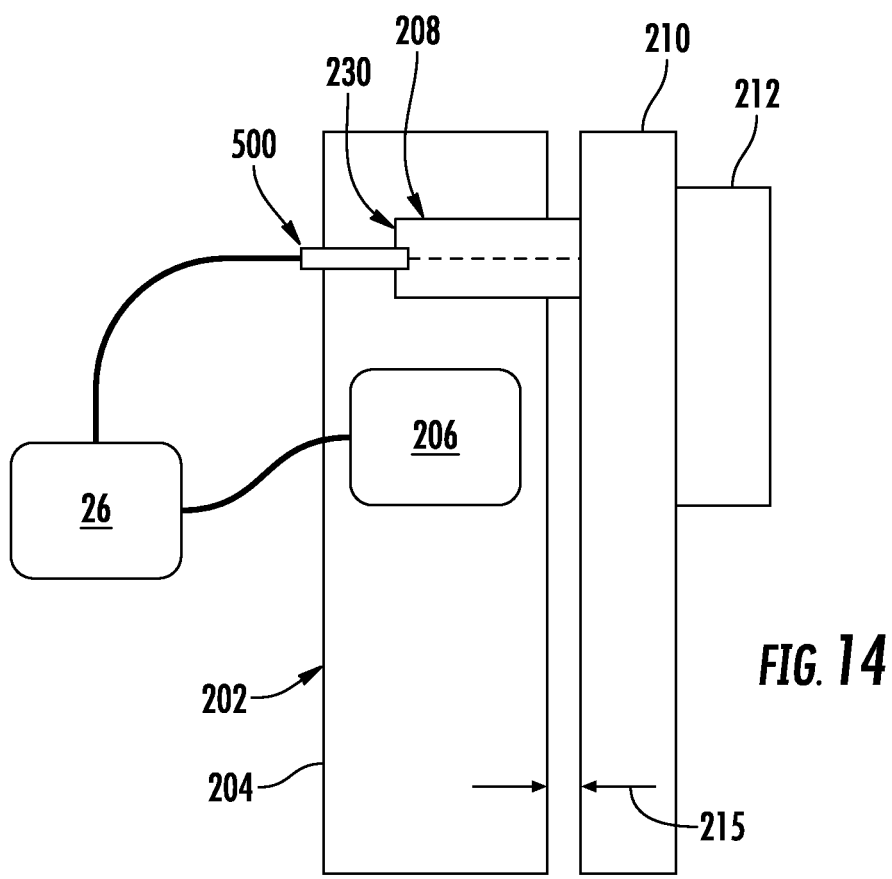
FIG. 14 illustrates a side view of another embodiment of a system for actively monitoring an air gap of a yaw brake assembly of a wind turbine in accordance with aspects of the present disclosure, particularly illustrating the system having a sensor system.

Referring now to FIG. 14, another embodiment of a sensor 500 for actively monitoring the air gap in a yaw brake assembly 200 of a wind turbine 10 is illustrated in accordance with aspects of the present disclosure. In particular, FIG. 14 illustrates a side view of the yaw brake assembly 200 with the sensor 500 installed. Thus, as shown, the sensor 500 is part of a data acquisition system (DAQ) including the sensor 500, a controller programmed with appropriate software, and a current amplifier communicatively coupled to the electromagnetic coil 206. It should be appreciated that the DAQ sensor 500 disclosed herein may generally have any suitable configuration known in the art.

As shown, the DAQ sensor 500 is positioned through the brake housing 204 of the brake body 202 through a pre-existing opening of the yaw brake assembly 200 associated with the spring set 208 to directly or indirectly sense relative position changes and/or relative displacement between components of the yaw brake assembly 200 of the wind turbine 10. In particular, in the illustrated embodiment, the DAQ sensor 500 is mounted within a pre-existing opening 230 defined by the brake housing 204 at a location directly above the location of the spring set coils 208. As such, when the DAQ sensor 500 is installed within the opening 230, the proximity sensor 500 can inspect the electric and/or magnetic readings from or through the coil 206. In this way, the DAQ sensor 500 is configured to be rigidly mounted in the wind turbine 10 at any suitable location using any suitable means that allows the DAQ sensor 500 to be able to monitor the spring set coils 208 and control the electromagnetic coil 206.

Figure 15:
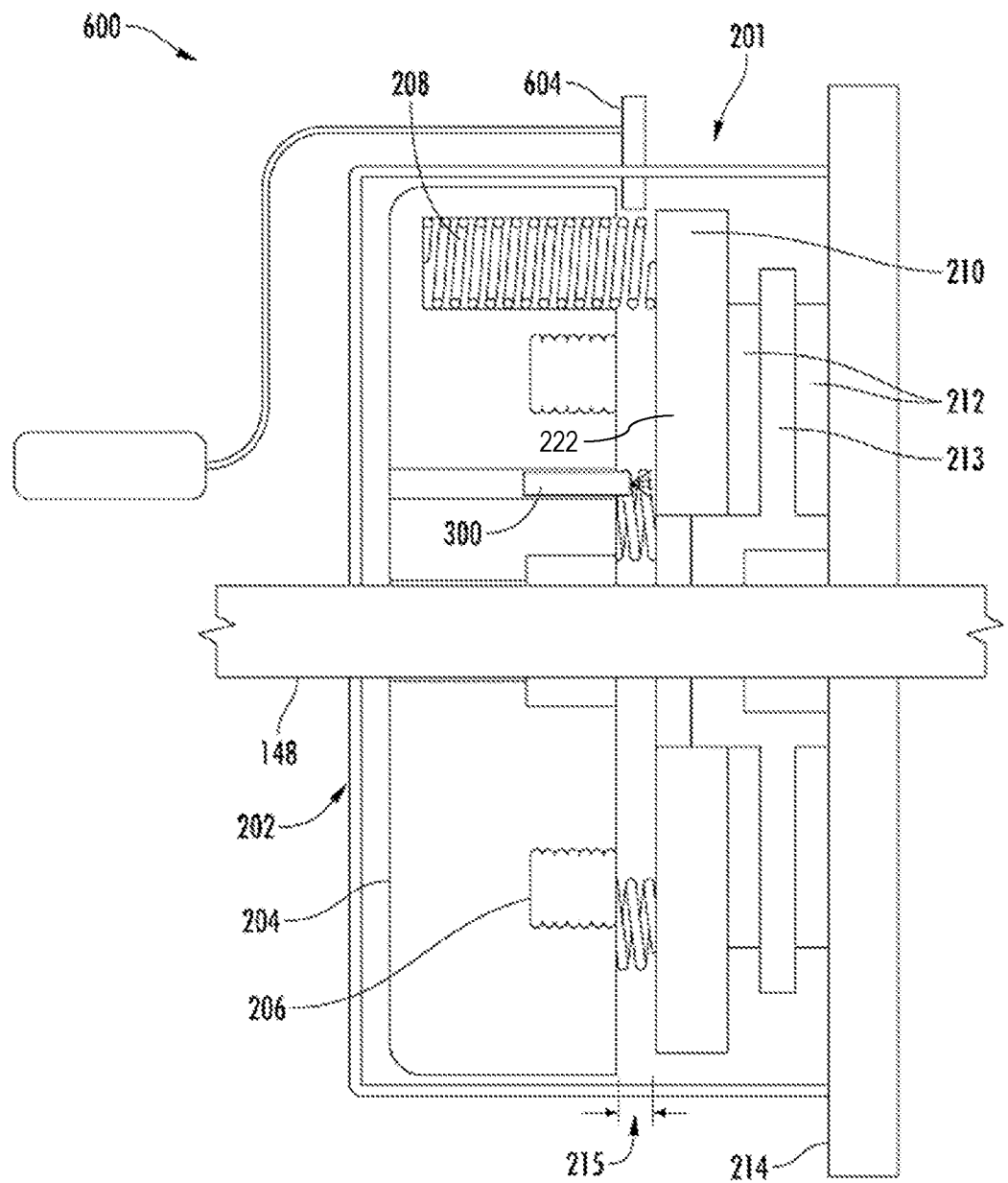
FIG. 15 illustrates a side view of yet another embodiment of the system for actively monitoring an air gap of a yaw brake assembly of a wind turbine in accordance with aspects of the present disclosure.

FIG. 15 illustrates a side view of another embodiment of a system 600 for actively monitoring an air gap 215 in accordance with aspects of the present disclosure, particularly illustrating another embodiment of a yaw brake assembly 201 and another embodiment of a sensor 604. The yaw brake assembly 201 is similar to the yaw brake assembly 200 except for the difference described herein. Generally, the yaw brake assembly 201 also is configured as a spring-applied electromagnetic holding brake for a rotating shaft 148. The brake assembly 201 includes the brake body 202, a spring set 208, a pressure plate 210, a brake rotor 213 mechanically engaged to the rotating shaft 148, a brake housing cover plate 214 configured as a yaw motor mounting plate, and a hub system 216 for mechanically engaging the shaft 148 to the brake rotor 213. For example, as shown in the illustrated embodiment, the brake housing 204 holds the coil 206 and sandwiches the other components of the brake assembly 200 up against the mounting cover plate 214.

The hub system 216 is configured to mechanically engage the rotating shaft 148 to the brake rotor 213. The brake rotor 213 provides the friction surface upon which the pressure plate 210 with brake pads 212 (illustrated as a caliper-type brake system) will act to engage the brake. It should be appreciated that the caliper-type system is configured to pinch to restrict rotation of the brake rotor 213 and may generally include any suitable structure and/or means for mechanically engaging to the friction surface of the brake rotor 213.

The brake rotor 213 with attached shaft 148 is sandwiched between the brake body 202 and the mounting cover plate 214. Also sandwiched between the brake body 202 and the mounting cover plate 214 is the spring set 208 and the pressure plate 210 with caliper-type configuration. In particular, the brake rotor 213 with attached shaft 148 is sandwiched between the pressure plate 210 and the brake housing cover plate 214 and pinched between the calipers, and the spring set 208 is sandwiched between the brake body 202, specifically, the brake housing 204, and the pressure plate 210. As such, when the yaw brake assembly 201 is fully assembled, the shaft 148 extends through the brake body 202, the pressure plate 210, and the mounting cover plate 214. The spring set 208 situated between the brake housing 204 and the pressure plate 210 pushes the pressure plate 210 away from the brake housing 204 which closes the calipers and pinches the brake rotor 213 (creating the air gap 215), which restricts any rotation of the brake rotor 213. In this way, the yaw brake assembly 201 is configured as a spring-applied electromagnetic holding brake. It should be appreciated that the configuration of the yaw brake assembly 201 is only provided as non-limiting examples of a suitable brake configuration with which the sensor described herein may be used.

The system 600 of FIG. 15 includes at least two sensors. One of the sensors 300 is a proximity sensor like that described for FIG. 12. As illustrated in FIG. 15, the proximity sensor 300 is positioned through the brake housing 204 of the brake body 202 to directly or indirectly sense relative position changes and/or relative displacement between components of the yaw brake assembly 201 of the wind turbine 10. In particular, in the illustrated embodiment, the proximity sensor 300 is mounted through the brake housing 204 at a location directly above a surface of the pressure plate 210. Another one of the sensors 604 is an optical sensor like that described for FIG. 13, but which is part of a DAQ system including at least one sensor, a controller programmed with appropriate software, and a current amplifier communicatively coupled to the electromagnetic coil 206. It should be appreciated that the DAQ sensor 604 disclosed herein may generally have any suitable configuration known in the art.

As shown, the DAQ sensor 604 is positioned adjacent the brake body 202 to directly or indirectly sense relative position changes and/or relative displacement between components of the yaw brake assembly 200 of the wind turbine 10. In particular, in the illustrated embodiment, the DAQ sensor 604 is embedded within the bedplate support frame 40 at a location in line with and parallel to the first surface 222 of the pressure plate 210. As such, when the DAQ sensor 604 is installed within the bedplate support frame 40, the DAQ sensor 604 is in line with the air gap 215 that lies between the brake body 202 and the pressure plate 210. In this way, the DAQ sensor 604 is configured to be rigidly mounted to the wind turbine 10 at any suitable location using any suitable means that allows the DAQ sensor 604 to be able to monitor the air gap 215 and implement a control action.

Figure 16:
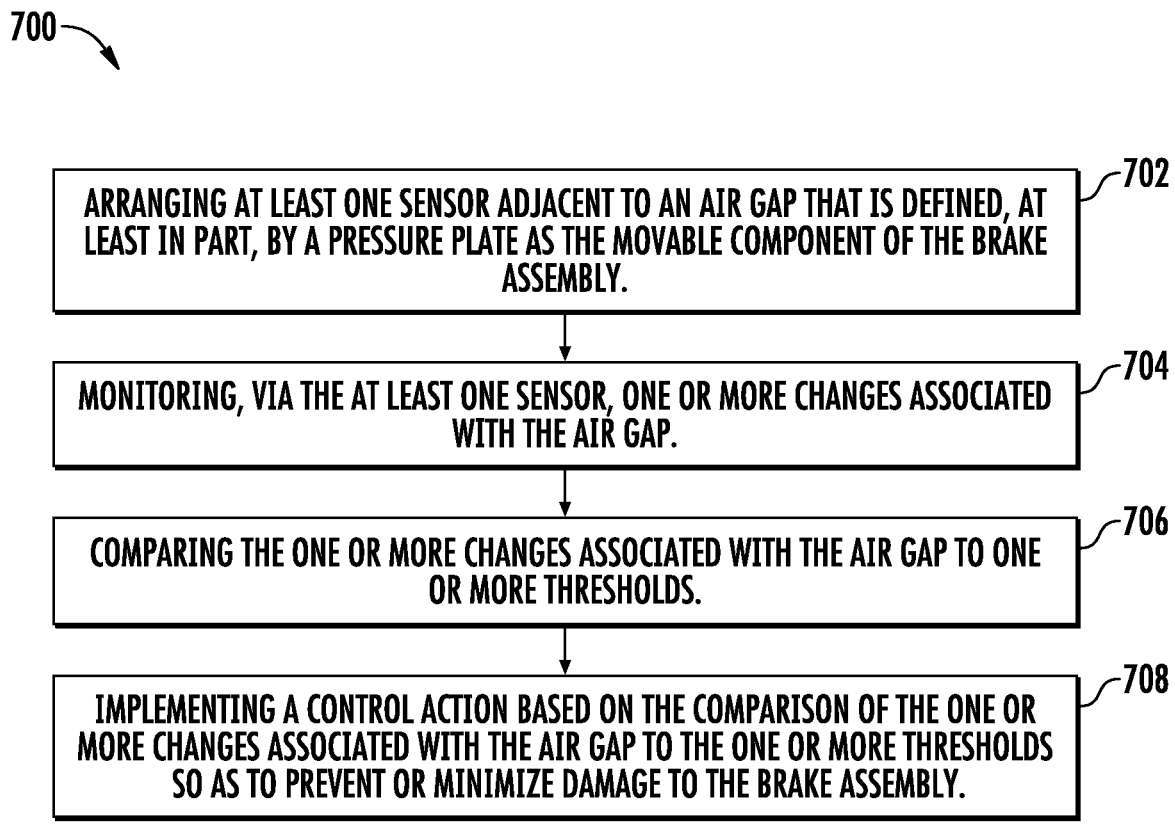
FIG. 16 illustrates an embodiment of a method for monitoring components of a brake assembly of a yaw drive assembly of a wind turbine.

Referring now to FIG. 16, a flow diagram of an embodiment of a method 700 for monitoring components of a brake assembly of a yaw drive assembly of a wind turbine is provided. In particular, the method 700 can be used to monitor the yaw brake assembly 200 or 201 of FIGS. 6-15, or to monitor any other suitable mechanism similar to the yaw brake assemblies described herein including brake mechanisms not applicable to wind turbines. In this regard, for example, the controller 26 of FIG. 3 may be configured for implementing the method 700. However, it should be appreciated that the method 700 is discussed herein only to describe aspects of the present disclosure and is not intended to be limiting.

Further, though FIG. 16 depicts a control method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the yaw brake assemblies 48, 200, and 201 as an example, it should be appreciated that these methods may be applied to any brake structure.

Moreover, as described herein, it may be advantageous to monitor changes to an air gap in a yaw brake assembly of a wind turbine and/or to monitor components of the yaw brake assembly. Accordingly, the method 700, as shown at (702), includes arranging at least one sensor adjacent to an air gap that is defined, at least in part, by a pressure plate as the movable component of the brake assembly. As shown at (704), the method 700 also includes monitoring, via the at least one sensor, one or more changes associated with the air gap. As shown at (706), the method 700 also includes comparing the one or more changes associated with the air gap to one or more thresholds. In certain embodiments, the monitoring and comparing steps may involve, in particular, receiving an output from the at least one sensor and estimating a relative distance between the pressure plate and the brake housing based, at least in part, on the output from the at least one sensor. Moreover, comparing the one or more changes associated with the air gap to one or more thresholds may also involve comparing the estimated relative distance between the pressure plate and the brake housing with one or more predetermined distance thresholds; and determining whether the estimated distance between the pressure plate and the brake housing deviates from the one or more predetermined distance thresholds based, at least in part, on the comparison.

Referring back to FIG. 16, and as shown at (708), the method 700 also includes implementing a control action based on the comparison of the one or more changes associated with the air gap 215 to the one or more thresholds so as to prevent or minimize damage to the brake assembly 201. In certain embodiments may involve, in particular, adjusting an input current for the electromagnetic coil 206 based, at least in part, on the estimated distance between the pressure plate 210 and the brake housing 204, or adjusting the air gap 215.

Further aspects of the invention are provided by the subject matter of the following clauses:

Clause 1. A method for monitoring components of a brake assembly of a yaw drive assembly of a wind turbine, the method comprising:
 arranging at least one sensor adjacent to an air gap that is defined, at least in part, by a movable component of the brake assembly;
 monitoring, via the at least one sensor, one or more changes associated with the air gap;
 comparing the one or more changes associated with the air gap to one or more thresholds; and
 implementing a control action based on the comparison of the one or more changes associated with the air gap to the one or more thresholds so as to prevent or minimize damage to the brake assembly of the yaw drive assembly.

Clause 2. The method of clause 1, wherein the at least one sensor comprises at least one of a proximity sensor and a distance sensor.

Clause 3. The method of clause 2, wherein the movable component of the brake assembly is a pressure plate mechanically coupled to one or more brake plates and a brake housing of the brake assembly, and wherein the at least one sensor comprises the proximity sensor, the method further comprising arranging the at least one proximity sensor adjacent the air gap to monitor a relative distance of the pressure plate from the brake housing.

Clause 4. The method of clause 3, further comprising:
 receiving an output from the at least one proximity sensor; and
 estimating the relative distance between the pressure plate and the brake housing based, at least in part, on the output from the at least one proximity sensor,
 wherein comparing the one or more changes associated with the air gap to one or more thresholds comprises:
  comparing the estimated relative distance between the pressure plate and the brake housing with one or more predetermined distance thresholds; and
  determining whether the estimated distance between the pressure plate and the brake housing deviates from the one or more predetermined distance thresholds based, at least in part, on the comparison.

Clause 5. The method of clause 4, wherein implementing the control action comprises at least one of adjusting an input current for an electromagnet of the braking housing based, at least in part, on the estimated relative distance between the pressure plate and the brake housing or adjusting the air gap.

Clause 6. The method of any of the preceding clauses, wherein the one or more changes comprises at least one of distance or temperature.

Clause 7. A yaw drive assembly for a wind turbine, the yaw drive assembly comprising:
 a yaw drive mechanism comprising a yaw drive pinion, a yaw drive gearbox, and a yaw drive motor;
 a brake assembly arranged with the yaw drive mechanism, the brake assembly comprising one or more brake plates, a movable component, and an air gap bound, at least in part, by the movable component, the one or more brake plates configured to engage a friction surface of the yaw drive mechanism, the movable component configured to move relative to the friction surface as the one or more brake plates wear;
 at least one sensor arranged adjacent to the air gap; and
 a controller communicatively coupled to the at least one sensor, the controller configured to perform a plurality operations, the plurality of operations comprising:
  receiving one or more sensor signals from the at least one sensor indicative of one or more changes associated with the air gap;
  comparing the one or more changes associated with the air gap to one or more thresholds; and
  implementing a control action based on the comparison of the one or more changes associated with the air gap to the one or more thresholds so as to prevent or minimize damage to the yaw drive assembly.

Clause 8. The yaw drive assembly of clause 7, wherein the at least one sensor comprises at least one of a proximity sensor and a distance sensor.

Clause 9. The yaw drive assembly of clause 8, wherein the movable component of the brake assembly comprises a pressure plate mechanically coupled to the one or more brake plates and a brake housing such that the air gap is bound, at least in part, by the pressure plate and the brake housing, and wherein the at least one sensor comprises the proximity sensor configured to monitor a relative distance of the pressure plate from the brake housing.

Clause 10. The yaw drive assembly of clause 9, wherein the plurality of operations further comprise:
  estimating a relative distance between the pressure plate and the brake housing based, at least in part, on the output from the at least one proximity sensor;
  comparing the estimated distance between the pressure plate and the brake housing with one or more predetermined distance thresholds; and
  determining whether the estimated distance between the pressure plate and the brake housing deviates from the one or more predetermined distance thresholds based, at least in part, on the comparison.

Clause 11. The yaw drive assembly of clause 10, wherein the brake housing further comprises an electromagnet, the plurality of operations further comprises adjusting an input current for the electromagnet based, at least in part, on the estimated relative distance between the pressure plate and the brake housing.

Clause 12. The yaw drive assembly of clause 9, wherein the at least one proximity sensor comprises at least one of an electromagnetic proximity sensor and an optical proximity sensor.

Clause 13. The yaw drive assembly of any of clauses 7-12, wherein the one or more changes comprises at least one of distance or temperature.

Clause 14. A system for monitoring components of a brake assembly of a yaw drive assembly of a wind turbine, the system comprising:
  at least one sensor arranged adjacent to an air gap positioned between one or more brake plates and a housing of the brake assembly, the one or more brake plates part of a movable component configured to move relative to a friction surface as the brake plate wears; and
  a controller communicatively coupled to the at least one sensor, the controller configured to perform a plurality operations, the plurality of operations comprising:
    receiving one or more sensor signals from the at least one sensor indicative of one or more changes associated with the air gap;
    comparing the one or more changes associated with the air gap to one or more thresholds; and
    implementing a control action based on the comparison of the one or more changes associated with the air gap to the one or more thresholds so as to prevent or minimize damage to the brake assembly of the yaw drive assembly.

Clause 15. The system of clause 14, wherein the at least one sensor comprises at least one of a proximity sensor and a distance sensor.

Clause 16. The system of clause 15, wherein the movable component of the brake assembly is a pressure plate mechanically coupled to the one or more brake plates and the brake housing such that the air gap is bound, at least in part, by the pressure plate and the brake housing, and wherein the at least one sensor comprises the proximity sensor configured to monitor a relative distance of the pressure plate from the brake housing.

Clause 17. The system of clause 16, wherein the plurality of operations further comprises:
  estimating the relative distance between the pressure plate and the brake housing based, at least in part, on the output from the at least one proximity sensor;
  comparing the estimated distance between the pressure plate and the brake housing with one or more predetermined distance thresholds; and
  determining whether the estimated distance between the pressure plate and the brake housing deviates from the one or more predetermined distance thresholds based, at least in part, on the comparison.

Clause 18. The system of clause 17, wherein the brake housing further comprises an electromagnetic coil, and wherein the plurality of operations further comprise adjusting an input current for the electromagnetic coil based, at least in part, on the estimated relative distance between the pressure plate and the brake housing.

Clause 19. The system of clause 16, wherein the at least one proximity sensor comprises at least one of an electromagnetic proximity sensor and an optical proximity sensor.

Clause 20. The system of any of clauses 14-19, wherein the one or more changes comprises at least one of distance or temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring components of a brake assembly of a yaw drive assembly of a wind turbine, the method comprising:
  arranging at least one sensor adjacent to an air gap that is defined between a movable pressure plate and a stationary brake housing wherein a spring set disposed between the brake housing and the pressure plate biases the pressure plate into a friction disk, the sensor disposed to look directly across or axially into the air gap;
  monitoring, via the at least one sensor, one or more changes associated with a change in an axial length of the air gap;
  comparing the one or more changes associated with the change in the axial length of the air gap to one or more thresholds; and
  implementing a control action based on the comparison of the one or more changes associated with the change in the axial length of the air gap to the one or more thresholds so as to prevent or minimize damage to the brake assembly of the yaw drive assembly.

2. The method of claim 1, wherein the at least one sensor comprises at least one of a proximity sensor and a distance sensor.

3. The method of claim 1, further comprising:
  receiving an output from the at least one sensor; and
  estimating a relative distance between the pressure plate and the brake housing based, at least in part, on the output from the sensor, wherein comparing the one or more changes associated with the change in the axial length of the air gap to one or more thresholds comprises:
comparing the estimated relative distance between the pressure plate and the brake housing with one or more predetermined distance thresholds; and
determining whether the estimated distance between the pressure plate and the brake housing deviates from the one or more predetermined distance thresholds based, at least in part, on the comparison.

4. The method of claim 3, wherein implementing the control action comprises at least one of adjusting an input current for an electromagnet of the braking housing based, at least in part, on the estimated relative distance between the pressure plate and the brake housing or adjusting the air gap.

5. The method of claim 1, wherein the one or more changes comprises at least one of distance or temperature.

6. A yaw drive assembly for a wind turbine, the yaw drive assembly comprising:
a yaw drive mechanism;
a brake assembly arranged with the yaw drive mechanism, the brake assembly comprising a movable pressure plate disposed between a stationary brake housing and a friction surface, a spring set disposed between the brake housing and the pressure plate that biases the pressure plate into the friction surface, wherein an air gap is defined between the pressure plate and the brake housing;
at least one sensor arranged adjacent to the air gap, the sensor disposed to look directly across or axially into the air gap; and
a controller communicatively coupled to the at least one sensor, the controller configured to perform a plurality operations, the plurality of operations comprising:
receiving one or more sensor signals from the at least one sensor indicative of one or more changes associated with a change in an axial length of the air gap;
comparing the one or more changes associated with the change in the axial length of the air gap to one or more thresholds; and
implementing a control action based on the comparison of the one or more changes associated with the change in the axial length of the air gap to the one or more thresholds so as to prevent or minimize damage to the yaw drive assembly.

7. The yaw drive assembly of claim 6, wherein the at least one sensor comprises at least one of a proximity sensor and a distance sensor.

8. The yaw drive assembly of claim 6, wherein the plurality of operations further comprise:
estimating a relative distance between the pressure plate and the brake housing based, at least in part, on the sensor signal from the at least one proximity sensor;
comparing the estimated distance between the pressure plate and the brake housing with one or more predetermined distance thresholds; and
determining whether the estimated distance between the pressure plate and the brake housing deviates from the one or more predetermined distance thresholds based, at least in part, on the comparison.

9. The yaw drive assembly of claim 8, wherein the brake housing further comprises an electromagnet, the plurality of operations further comprises adjusting an input current for the electromagnet based, at least in part, on the estimated relative distance between the pressure plate and the brake housing.

10. The yaw drive assembly of claim 6, wherein the at least one sensor comprises at least one of an electromagnetic proximity sensor and an optical proximity sensor.

11. The yaw drive assembly of claim 6, wherein the one or more changes comprises at least one of distance or temperature.

12. A system for monitoring components of a brake assembly of a yaw drive assembly of a wind turbine, the system comprising:
at least one sensor arranged to look directly across or axially into an air gap defined between a movable pressure plate and a stationary brake housing, wherein a spring set disposed between the brake housing and the pressure plate biases the pressure plate into a friction plate; and
a controller communicatively coupled to the at least one sensor, the controller configured to perform a plurality operations, the plurality of operations comprising:
receiving one or more sensor signals from the at least one sensor indicative of one or more changes associated with a change in an axial length of the air gap;
comparing the one or more changes associated with the change in the axial length of the air gap to one or more thresholds; and
implementing a control action based on the comparison of the one or more changes associated with the change in the axial length of the air gap to the one or more thresholds so as to prevent or minimize damage to the brake assembly of the yaw drive assembly.

13. The system of claim 12, wherein the at least one sensor comprises at least one of a proximity sensor and a distance sensor.

14. The system of claim 12, wherein the plurality of operations further comprises:
estimating a relative distance between the pressure plate and the brake housing based, at least in part, on the sensor signals from the at least one proximity sensor;
comparing the estimated distance between the pressure plate and the brake housing with one or more predetermined distance thresholds; and
determining whether the estimated distance between the pressure plate and the brake housing deviates from the one or more predetermined distance thresholds based, at least in part, on the comparison.

15. The system of claim 14, wherein the brake housing further comprises an electromagnetic coil, and wherein the plurality of operations further comprise adjusting an input current for the electromagnetic coil based, at least in part, on the estimated relative distance between the pressure plate and the brake housing.

16. The system of claim 14, wherein the at least one proximity sensor comprises at least one of an electromagnetic proximity sensor and an optical proximity sensor.

17. The system of claim 12, wherein the one or more changes comprises at least one of distance or temperature.

* * * * *